March 12, 1968  J. J. HOVORKA  3,372,786
COIN-CONTROLLED APPARATUS WITH CONCENTRIC,
COIN-CONNECTED, TURNING PARTS
Filed March 9, 1966  10 Sheets-Sheet 1
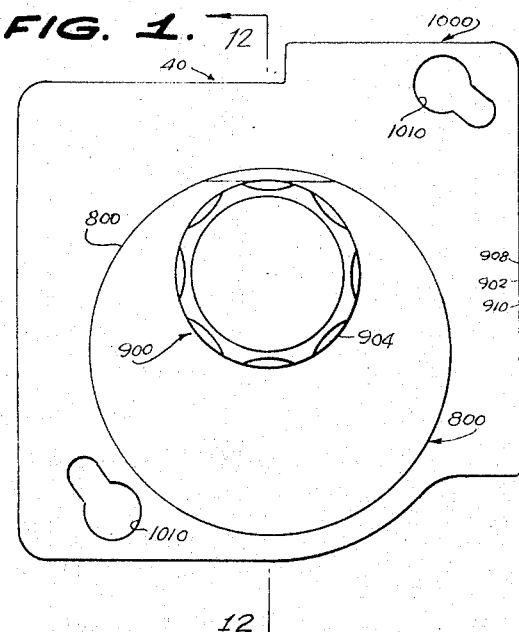
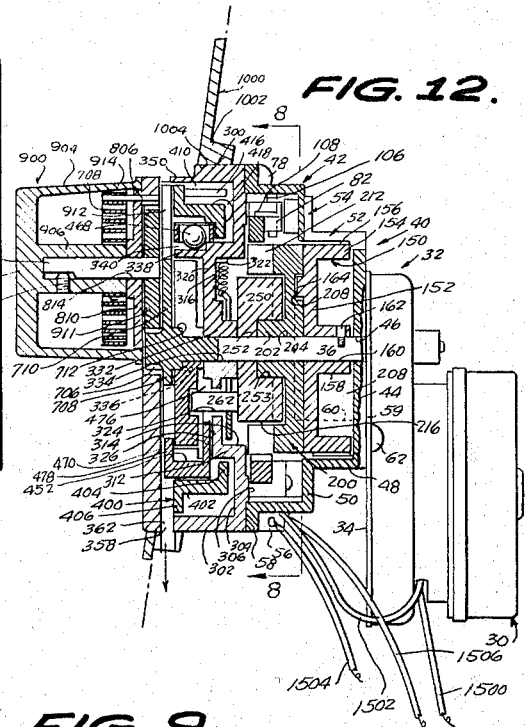
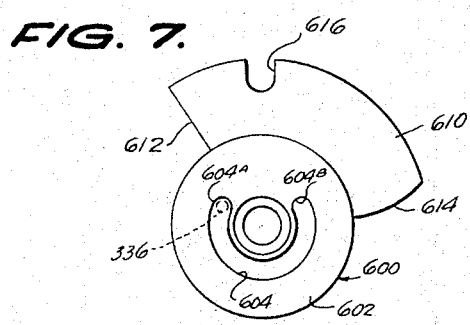
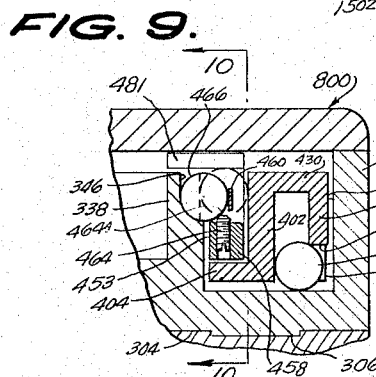
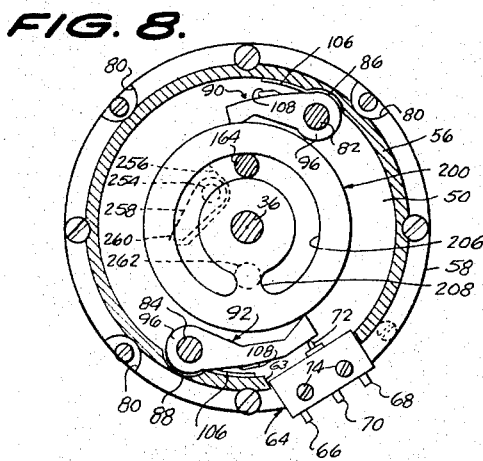
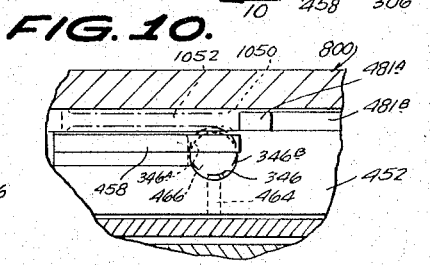
INVENTOR.
JIRI J. HOVORKA,
BY
Berman, Davidson & Berman
ATTORNEYS.

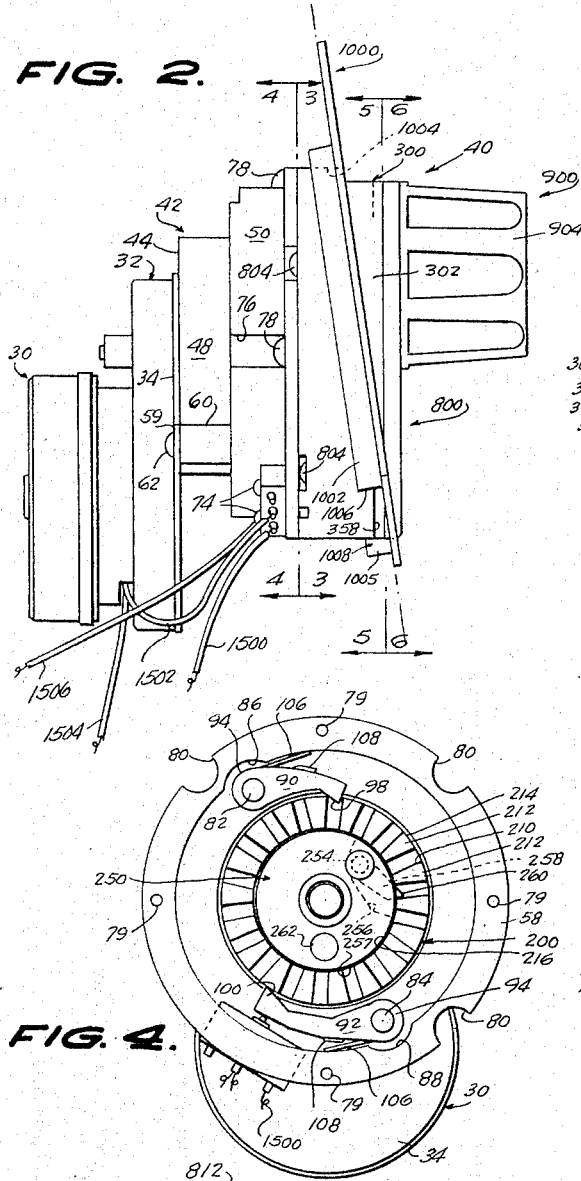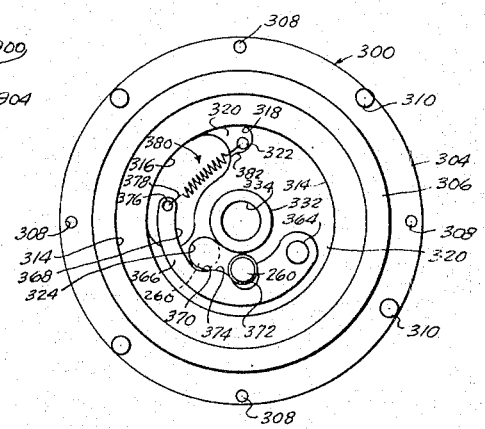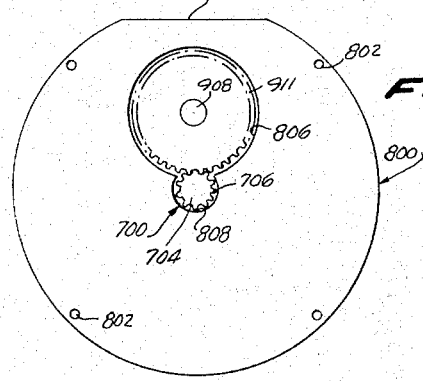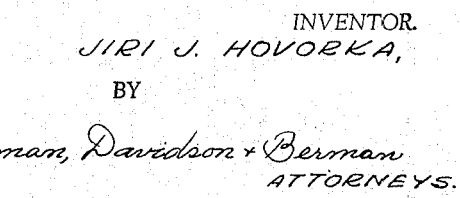

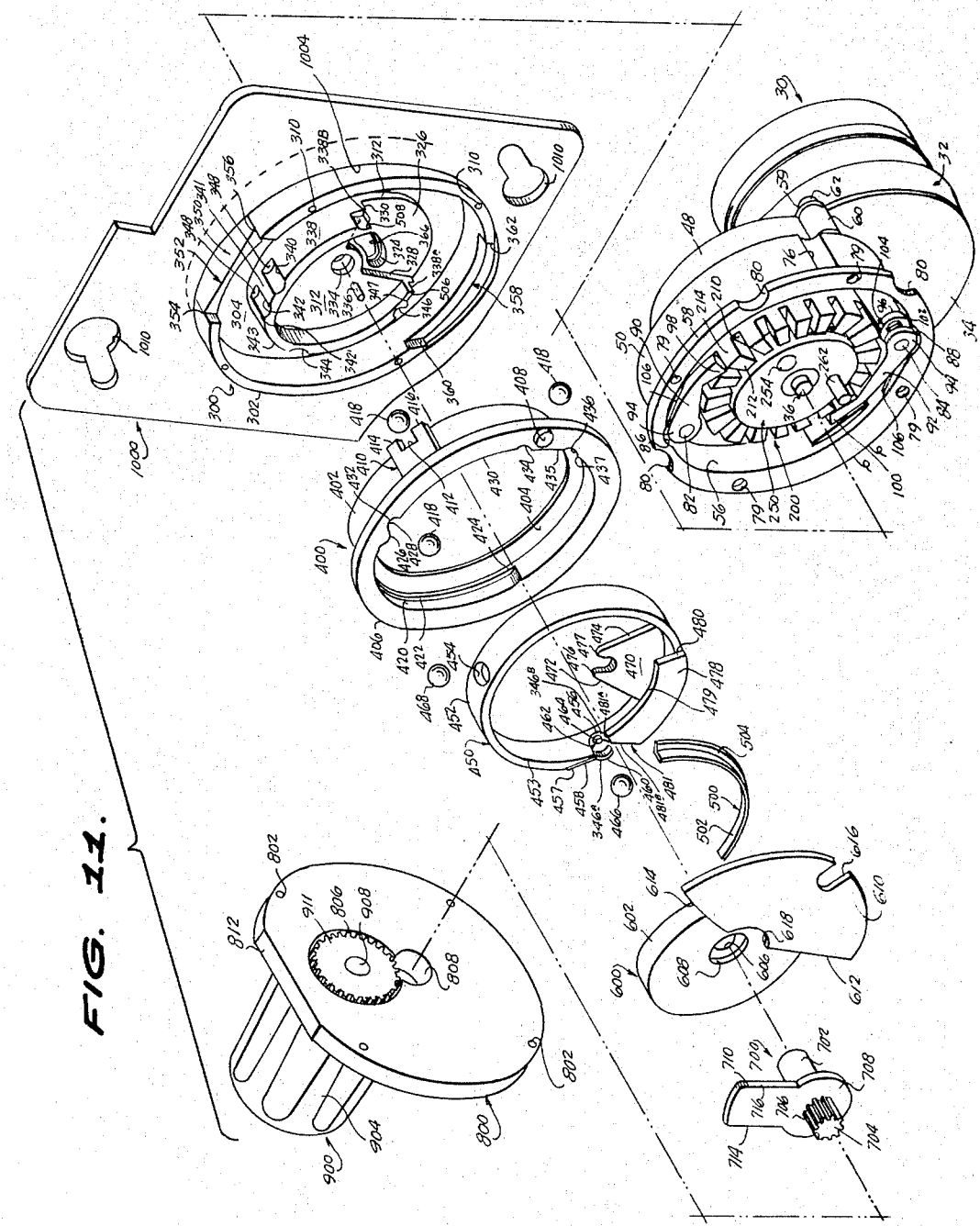

March 12, 1968
J. J. HOVORKA
3,372,786
COIN-CONTROLLED APPARATUS WITH CONCENTRIC,
COIN-CONNECTED, TURNING PARTS
Filed March 9, 1966
10 Sheets-Sheet 4
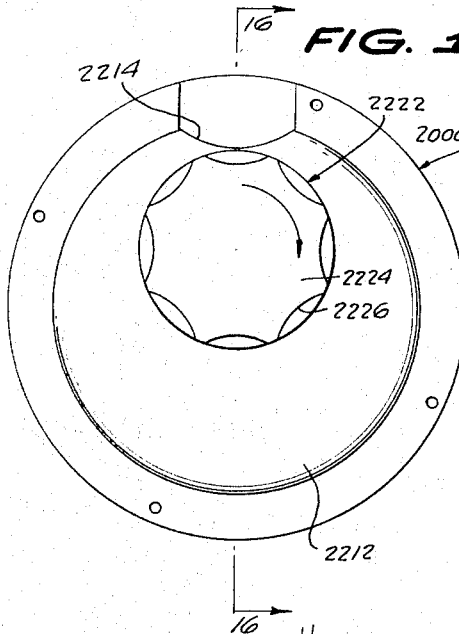
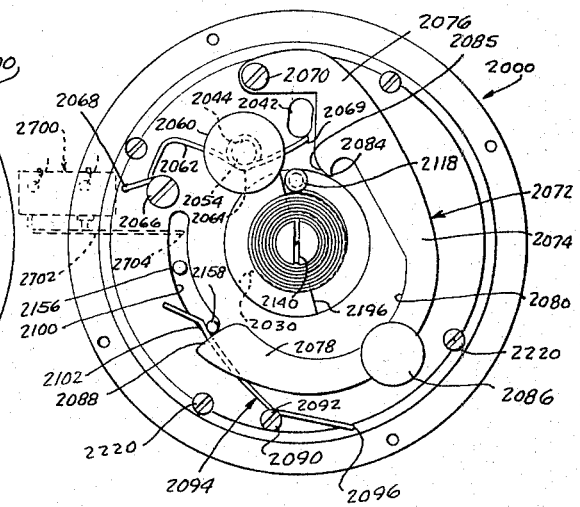
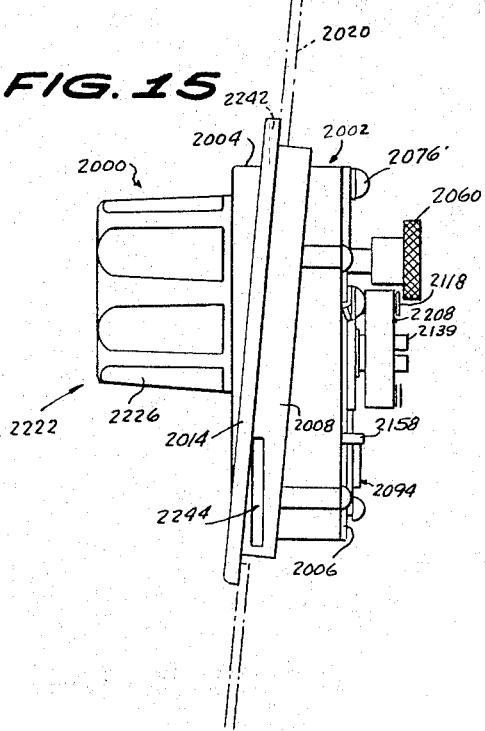
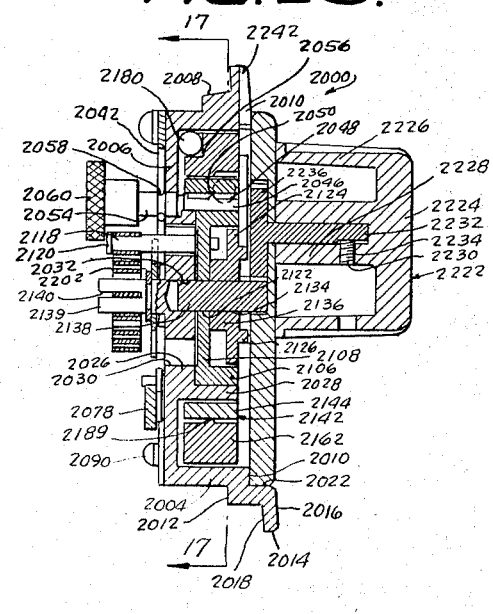
INVENTOR.
JIRI J. HOVORKA,
BY
Berman, Davidson & Berman
ATTORNEYS.

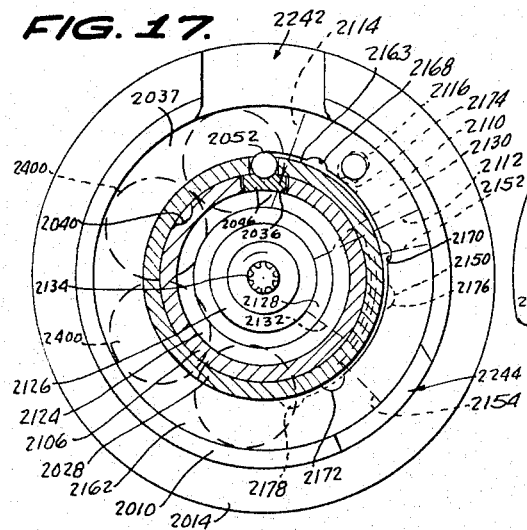
FIG. 17.
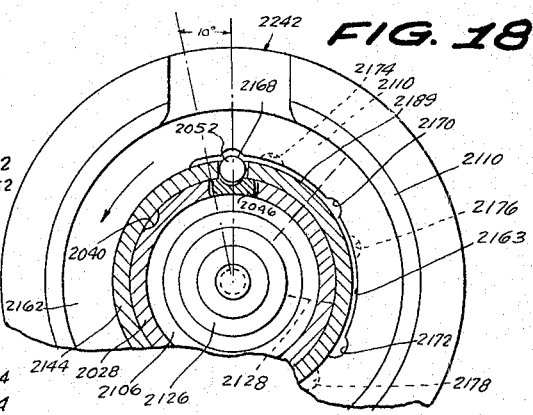
FIG. 18.
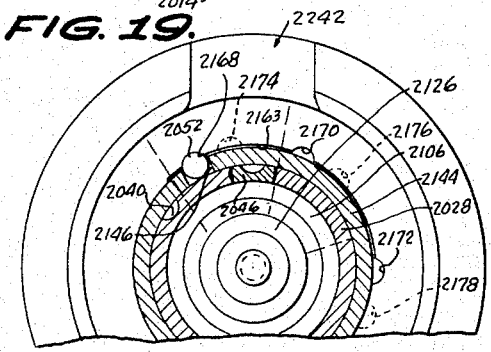
FIG. 19.
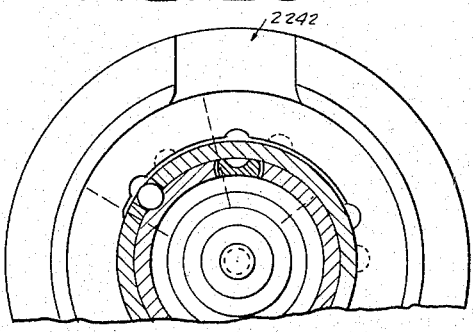
FIG. 20.
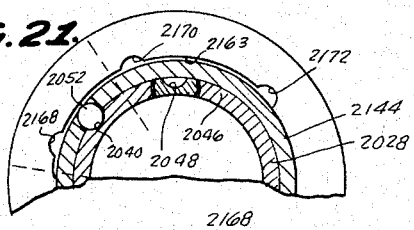
FIG. 21.
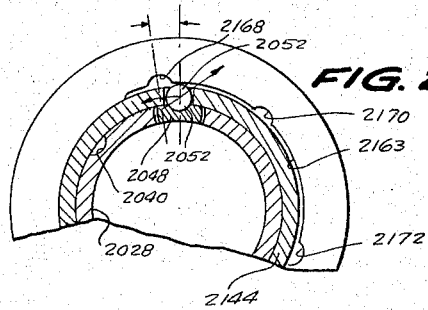
FIG. 22.
FIG. 23.
INVENTOR.
JIRI J. HOVORKA,
BY
Berman, Davidson & Berman
ATTORNEYS.

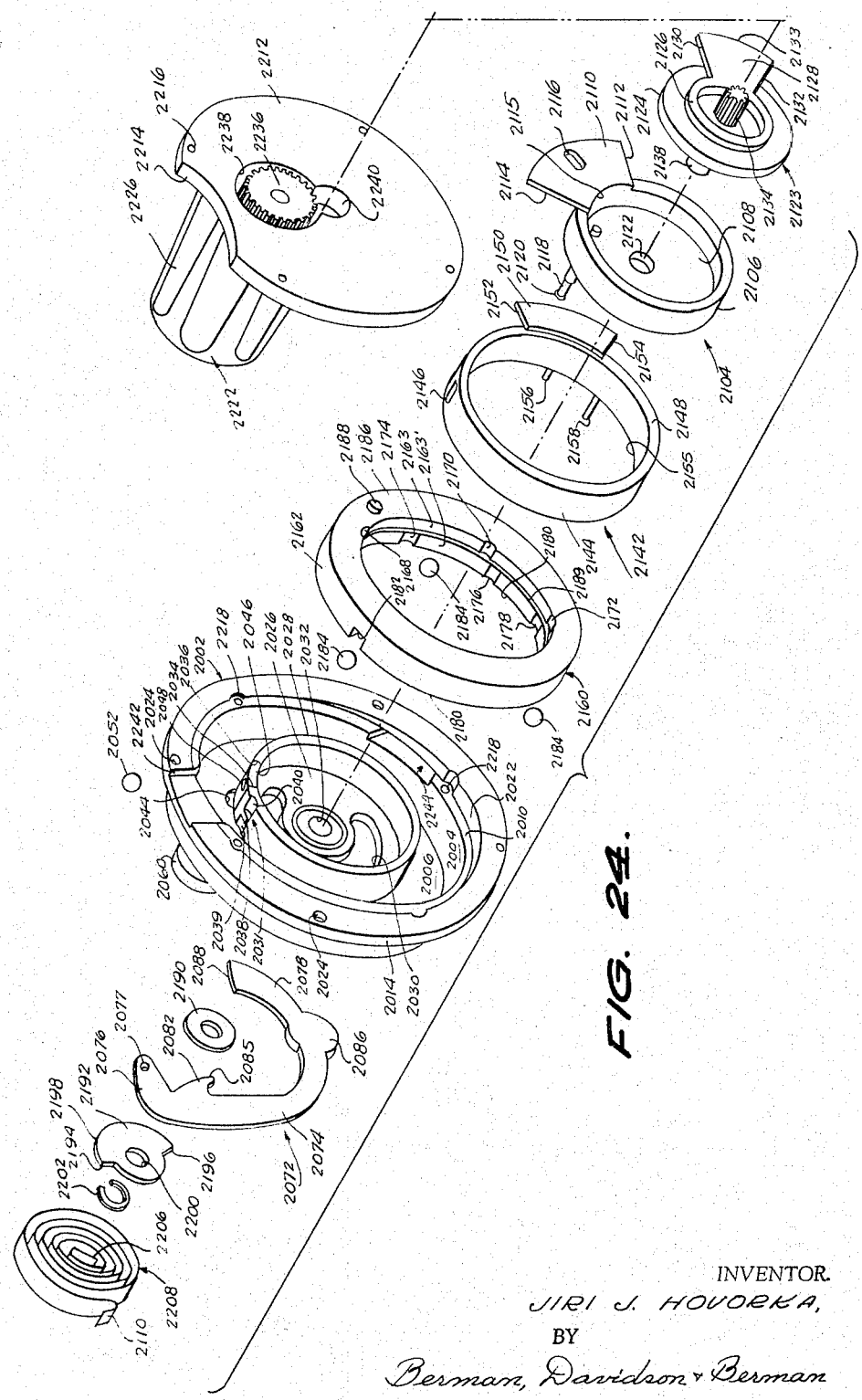

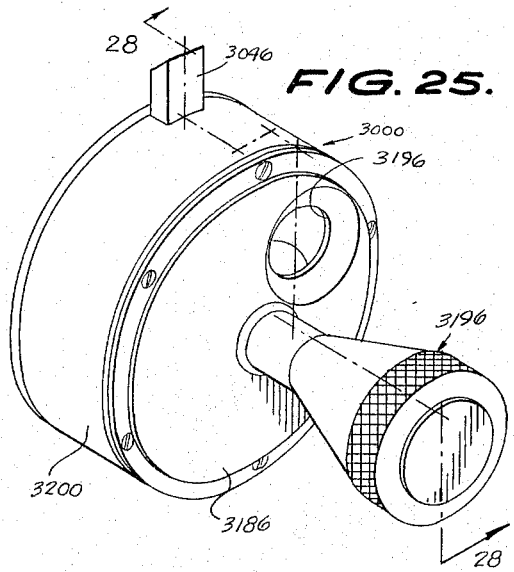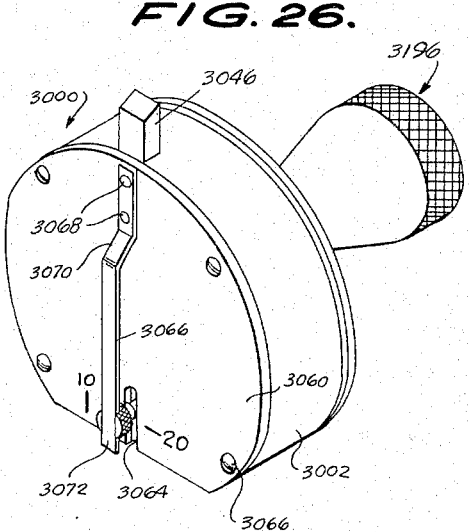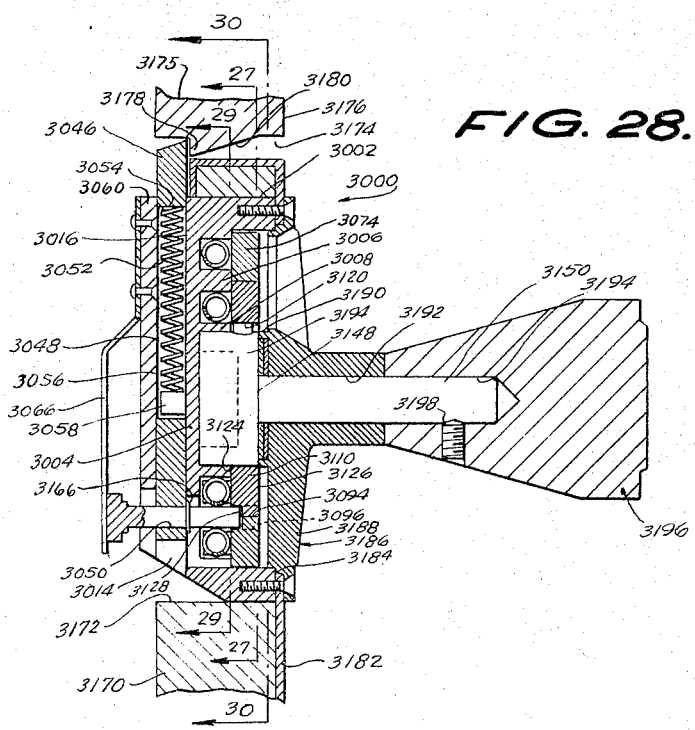

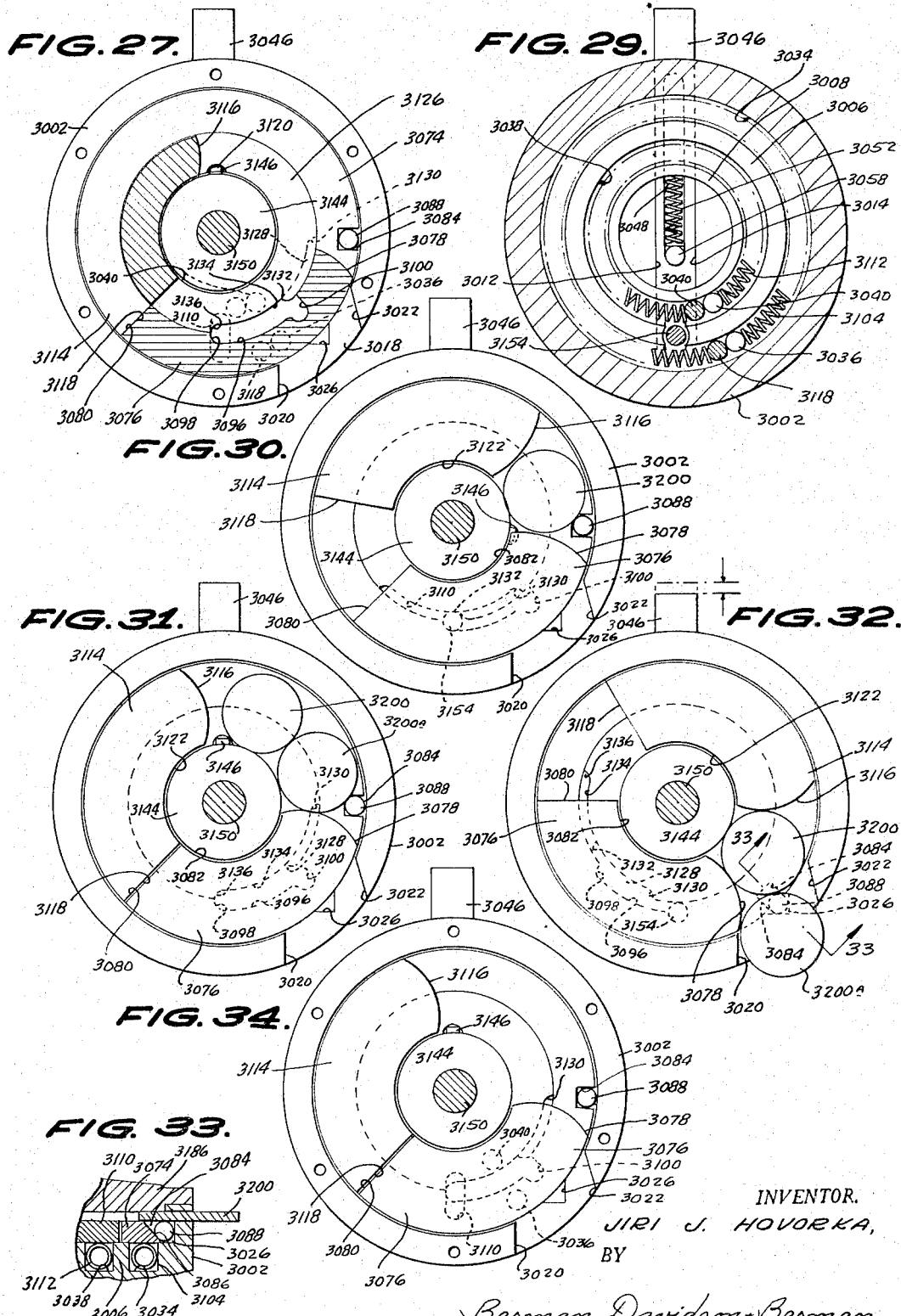

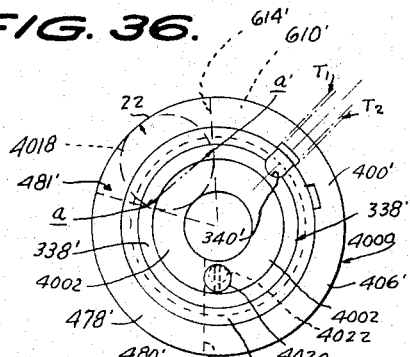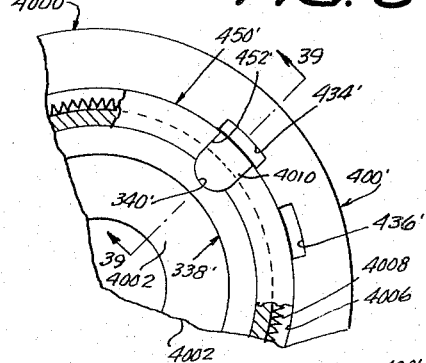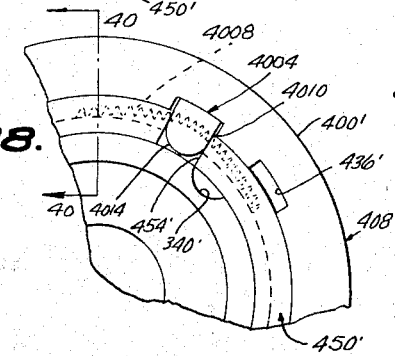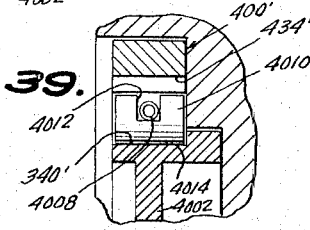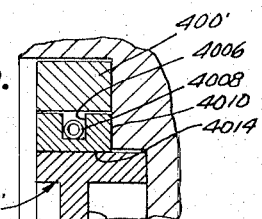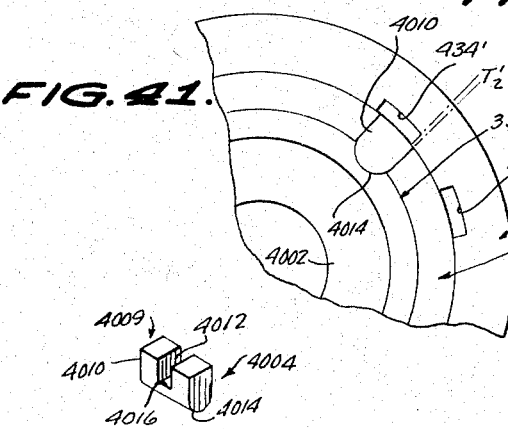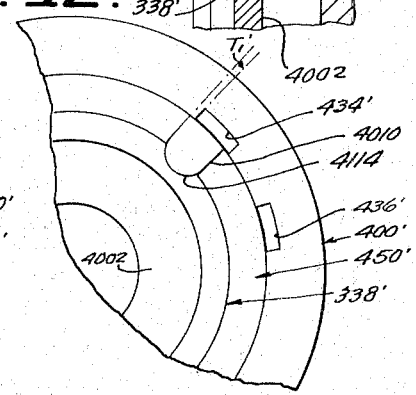

3,372,786
COIN-CONTROLLED APPARATUS WITH CONCENTRIC, COIN-CONNECTED, TURNING PARTS
Jiri J. Hovorka, Miami, Fla., assignor to U.S. Coin Controls, Inc., Miami, Fla., a corporation of Florida
Filed Mar. 9, 1966, Ser. No. 532,982
24 Claims. (Cl. 194—84)

ABSTRACT OF THE DISCLOSURE

Coin-control apparatus for accepting one coin or a plurality of coins of the same aggregate value as said one coin in which one or more rotors propel one or more coins around the periphery of a stator; radially movable locking means carried by the stator and one or more peripherally spaced means carried by the rotor whereby to disable the locking means of the stator if the coin (or such plurality of coins) subtend an arc on said stator within predetermined tolerances for acceptance of the coins, or for rejection of the coins if such tolerances be not met. Rejection of such coins is accomplished by the reversal of the rotor to expel the coins through the same channel by which they entered. Said mechanism optionally includes means preventing rejection of any of the coins once they have been found acceptable. In short, once the coins are found to be acceptable, the operation *must* be completed and the coins delivered to their proper depository.

---

In its broadest connotation, this invention is directed to the provision of means which becomes operable in the presence of one or more coins having a substantially cylindrical configuration and of predetermined sizes of values. In a somewhat more limited sense, this invention is directed to the provision of apparatus of varying applications of which several are described and illustrated herein wherein the invention is directed to coin-control means which operate on pre-purchased time and wherein the time of operation of the controlled device may be increased by the insertion within the means of two or more coins to accumulate time operation of equal or unequal lengths, and wherein the operating principle of the control means may be extended to effect a lock release, mechanical or electrical, in the presence of one or more coins.

Thus, and to the end sought to be achieved through the practice of this invention, one of the primary objects thereof is to provide a coin-controlled unit wherein the device controlled by the unit is released for operation in the presence of a single coin in the unit of predetermined value or, depending upon the type of operation to which the unit is to be utilized, in the presence of a plurality of coins of predetermined denomination, and wherein the coin-controlled unit is provided with coin-reject means and additional control features which are designed to discourage of minimize tampering with the coin-controlled unit.

Relative to the application of the inventive concept to a coin-controlled time-accumulating device, one of the primary objects of the invention is to provide a device of the type generally described which may be actuated by, for example, either of two coins for providing different time-operation intervals, for example, it may be desired to cause the device to operate for ten minutes for a price of ten cents (a dime) or for thirty minutes for the price of twenty-five cents (a quarter), the invention has as a main object, the provision of these means which may be accepted separately within the unit and wherein through the subsequent deposit of other coins of the same denominations, one-at-a-time, the device may be operated for an increased or augmented time to the extent represented by the denomination of the coin or coins so deposited.

Another object of this invention is to provide a coin-controlled unit which is, speaking in terms of contemporary devices of a related nature, relatively small and compact as to its physical dimensions, highly efficient and dependable in operation, and wherein the efficiency and dependability of the operation of the unit is influenced to a large degree by the self-cleaning of all mechanical components of the unit, the cleaning being inherently accomplished through the rotary or sliding relative movement between adjacent surfaces which constantly wipe clean the working surfaces to eliminate clogging and the consequent malfunction of the device. To this end and by way of a further anticipation of mechanical malfunctions of the device and to reduce the same to a minimum, the component elements of the unit or units disclosed herein, wherever possible, are manufactured of a corrosion-resistant material; and in the interest of economy and precision, the component elements of the device are provided by precision die casting to eliminate expensive machining operations, the die-cast parts being preferably made of any suitable die-cast alloy and copper and nickle-plated for smooth function and self-lubrication, and where die casting is neither feasible nor practical, to form the other components of the device by the stamping of stainless steel. This insures the manufacture of the involved elements of the device in the most economical method of production and at the lowest possible cost.

Another object of this invention is to provide a coin-controlled unit which becomes operable upon the presence of a single or a plurality of coins which represent a total predetermined value representing a pre-established price.

A further object of this invention is to provide a coin-controlled unit which incorporates simple mechanical means for pre-setting the device to become operable in response to the presence of coins representing one of two predetermined pre-set prices.

Still another object of this invention is to provide a coin-controlled unit which is rendered operative upon the insertion of coins therein and the subsequent turning of a lever or handle in one direction to effect the deposit of the coins in the device, or, by turning the handle in the opposite direction before the operation of the device is effected, to actuate means which are operable to return the deposited coin or coins.

It is a still further object of this invention to provide a coin-controlled unit which incorporates therein kinematic means for effecting the operation of a mechanical lever or performing a mechanical function which, for example, might be utilized in the closing of an electrical circuit to energize an electrical system.

As will be seen infra, this invention contemplates, as yet another object thereof, the provision of means to detect and refuse acceptance of fraudulent coins without recourse to the conventional weight and/or electrical detection devices known heretofore in the art.

This invention has, as still another object thereof, the provision of coin-controlled apparatus of the type generally described supra, the apparatus being relatively non-complex in construction and assembly, and which may be inexpensively manufactured, and which is rugged and durable in use.

Other and further objects and advantages of the instant invention are contemplated and will become more evident from a consideration of the following specification when read in conjunction with the annexed drawings, in which:

FIGURE 1 is a front elevational view of the coin-controlled time-accumulator unit constructed in accordance with the teachings of this invention;

FIGURE 2 is a side elevational view of the time-accumulator unit shown in FIGURE 1;

FIGURE 3 is a rear elevational view of the hollow cylindrical main housing of the time-accumulator unit together with elements associated therewith, FIGURE 3 being taken substantially on the vertical plane of line 3—3 of FIGURE 2, looking in the direction of the arrows;

FIGURE 4 is a front end elevational view of the time-accumulator rotor and parts associated therewith, FIGURE 4 being taken substantially on the vertical plane of line 4—4 of FIGURE 2, looking in the direction of the arrows;

FIGURE 5 is an end elevational view of the time-accumulator main housing, outer rotor ring, inner rotor ring, the indexing rotor, the gear rod and actuating member as assembled, FIGURE 5 being taken substantially on the vertical plane of line 5—5 of FIGURE 2, looking in the direction of the arrows;

FIGURE 6 is a rear end elevational view of the cover plate and gear train drive means of the handle assembly, FIGURE 6 being taken substantially on the vertical plane of line 6—6 of FIGURE 2, looking in the direction of the arrows;

FIGURE 7 is a rear plan view of the rotor ring assembly;

FIGURE 8 is a rear end elevational view, partly in cross-section, FIGURE 8 illustrating the assembly of the time-accumulator rotor, microswitch, index arm, and trigger arm or switch actuator, FIGURE 8 being taken substantially on the vertical plane of line 8—8 of FIGURE 12, looking in the direction of the arrows;

FIGURE 9 is an enlarged fragmentary detail cross-sectional view showing the means for detecting an improper or spurious coin (slug), FIGURE 9 being taken substantially on the inclined plane of line 9—9 of FIGURE 5, looking in the direction of the arrows;

FIGURE 10 is a detail cross-sectional view of the detecting means of FIGURE 9, FIGURE 10 being taken substantially on the vertical plane of line 10—10 of FIGURE 9, looking in the direction of the arrows;

FIGURE 11 is an exploded perspective view of the time-accumulator unit;

FIGURE 12 is a detail medial vertical cross-sectional view of the time-accumulator, FIGURE 12 being taken substantially on the vertical plane of line 12—12 of FIGURE 1, looking in the direction of the arrows;

FIGURE 13 is a front elevational view of a two-price control unit constructed according to this invention;

FIGURE 14 is a rear elevational view of the coin-controlled unit shown in FIGURE 13;

FIGURE 15 is a side elevational view of the coin-controlled unit;

FIGURE 16 is a medial detail cross-sectional view of the coin-controlled unit, FIGURE 16 being taken substantially on the vertical plane of line 16—16 of FIGURE 15, looking in the direction of the arrows;

Figure 35:
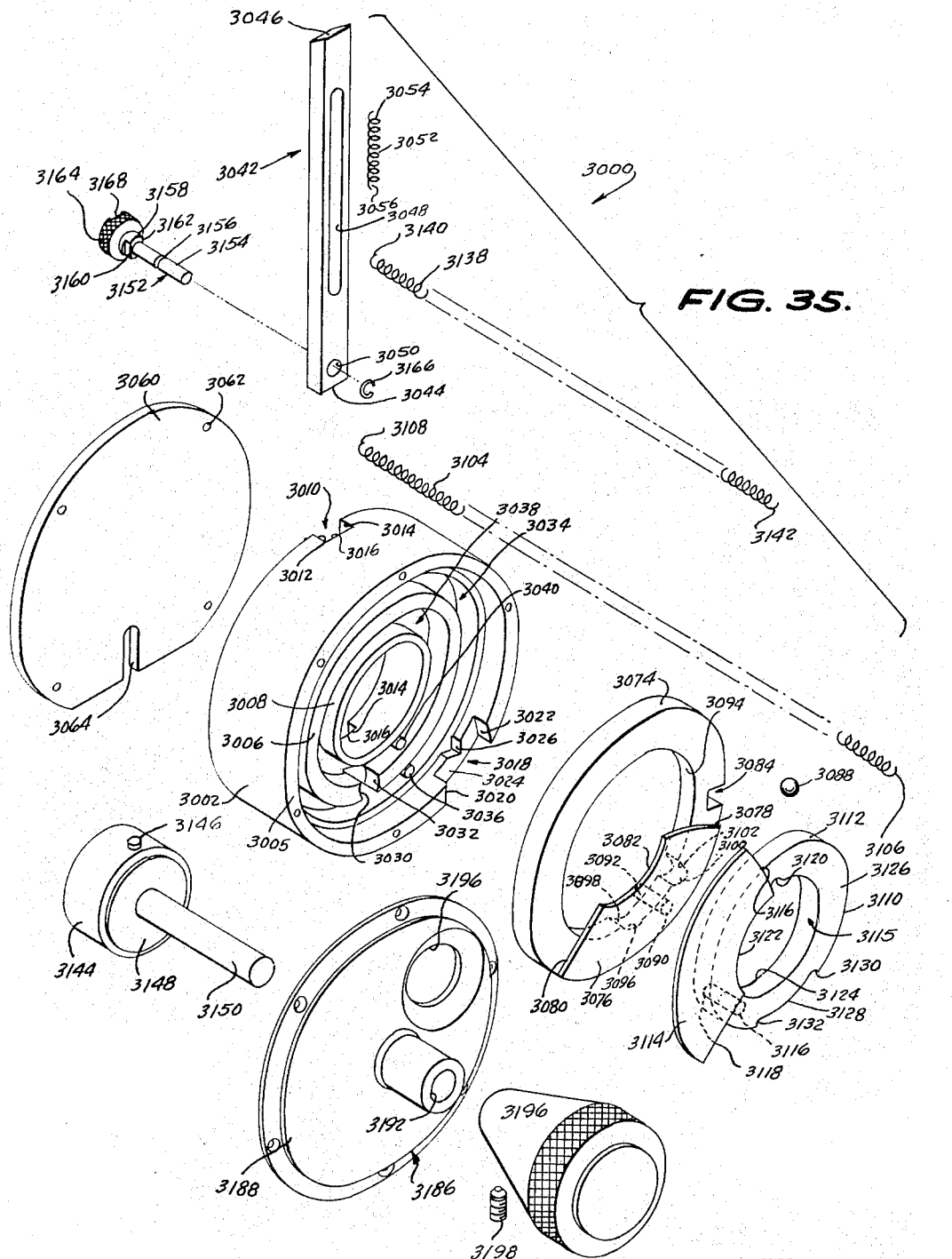

FIGURES 17 through 23, inclusive, demonstrate the function and position of certain internal elements of the coin-controlled unit of FIGURE 13, through the various stages of operation thereof, each of these figures being taken substantially on the vertical plane of line 17—17 of FIGURE 16, looking in the direction of the arrows, and in which;

FIGURE 17 illustrates the position of the control ball, the relationship of the inner and outer rotors and of the stator while at rest and disposed in such positions as to receivce four coins of equal size and denominations as the same have been inserted in the coin-controlled unit;

FIGURE 18 demonstrates the relative positions of the several components of the elements after the outer control rotor has been turned counterclockwise through an arc of substantially 10° and showing the alignment of the control ball relative to the outer rotor when the proper number of coins have been inserted in the unit and just prior to the actuation of the device;

FIGURE 19 shows the position of the component elements of the unit, that is, the relative positions of the inner and outer rotors with respect to the stator as the inner and outer rotors are locked together for movement simultaneously with one another and illustrating the position of the inner and outer rotors as the coins are passed through the discharge slot of the unit;

FIGURE 20 illustrates the positions of the outer and inner rotors with respect to the stator when the inner rotor has reached its maximum throw counterclockwise and wherein the control ball is removed from its locking position with the outer rotor to permit the outer rotor to continue its counterclockwise rotation;

FIGURE 21 illustrates the relative positions of the outer and inner rotors with respect to the stator when the outer rotor has completed its turning movement to effect the complete discharge of the coins within the unit;

FIGURE 22 demonstrates the position taken by the outer control rotor in the presence of an improper coin combination (three nickels and a penny instead of four nickels, for example), illustrating the locked condition of the outer and inner rotors affected by the control ball while seated on the price-control rod;

FIGURE 23 shows the relative positions of the outer and inner rotors with respect to the stator, its price-control rod and the control ball when the device is actuated in the presence of one or more coins, the diameters of one or more thereof varying slightly from the accepted standard, and/or in the presence of a slug;

FIGURE 24 is an exploded perspective view of the coin-control unit of FIGURE 13;

FIGURE 25 is a front perspective view of a further embodiment of the control unit employing multiple-coin combinations and plural purchase-price features;

FIGURE 26 is a rear perspective view of the embodiment shown in FIGURE 25;

FIGURE 27 is a front elevational view, partly in cross-section, of the embodiment shown in FIGURE 25, the front face plate thereof having been removed;

FIGURE 28 is a detail medial transverse cross-sectional view, FIGURE 28 being taken substantially on the vertical plane of line 28—28 of FIGURE 25, looking in the direction of the arrows;

FIGURE 29 is a detail cross-sectional view of the relative positions of certain component elements of the device shown in FIGURE 25 when at rest;

FIGURE 30 is a cross-sectional view, partly in elevation and showing the relative positions of certin component elements of the invention as they have been moved from their positions at rest toward their respective coin-discharge positions;

FIGURE 31 is a cross-sectional view, partly in elevation and similar to FIGURE 30, FIGURE 31 showing the relative positions of the component elements of the device in accepting two deposited coins;

FIGURE 32 is a cross-sectional view, partly in elevation, showing the relative positions of the component elements of the device and its deposited coins as moved to their coin-discharge positions;

FIGURE 33 is an enlarged fragmentary detail cross-sectional view, FIGURE 33 being taken substantially on the inclined plane of line 33—33 of FIGURE 32, looking in the direction of the arrows;

FIGURE 34 is a front end elevational view of the coin-control device shown in FIGURE 25, the front face plate thereof having been removed, FIGURE 34 showing the component elements of the device in their at rest positions;

FIGURE 35 is an exploded perspective view of the embodiment shown in FIGURE 25;

FIGURE 36 is a front elevational view showing a still further embodiment of the invention wherein the control elements are illustrated as being at rest and including a showing of means for adjusting the device to predetermined tolerances to accept coins having minimal plus-orminus diameters with respect to a given specification therefor, and further showing a variation of the structure of certain of the interlocking control elements;

FIGURE 37 is a fragmentary enlarged front elevational view of the device or unit shown in FIGURE 36 and showing the component elements of the device or unit in perfect aligned position while at rest, or in their respective zero or inoperative positions;

FIGURE 38 illustrates the position of certain component elements of the invention in accepting a given coin or coins and moving to the respective coin-discharge positions;

FIGURE 39 is an enlarged fragmentary detail cross-sectional view, FIGURE 39 being taken substantially on the inclined plane of line 39—39 of FIGURE 37, looking in the direction of the arrows;

FIGURE 40 is an enlarged fragmentary detail cross-sectional view, FIGURE 40 being taken substantially on the vertical plane of line 40—40 of FIGURE 38, looking in the direction of the arrows;

FIGURE 41 illustrates the relative positions of the component elements of the modification shown in FIGURE 36 under the conditions of mal-alignment at the assembly stage or the positions taken thereby upon the deposit of a coin having a diameter less than the accepted tolerance of the device;

FIGURE 42 is an enlarged fragmentary front elevational view showing a similar assembly mal-adjustment or the position of the parts upon the acceptance of a coin having a diameter greater than the accepted tolerance; and FIGURE 43 is an enlarged perspective view of the control element for the embodiment of the invention shown in FIGURE 36.

The first embodiment of this invention is illustrated in FIGURES 1 to 12, inclusive, of the drawings, and incorporates certain basic and underlying principles of construction and operation which find general application through the repetition thereof in the description and illustration of the embodiments of the invention which are specifically described infra. In the embodiment of this invention which is set forth immediately below, the basic inventive concept has been adapted to the provision of a control unit for a mechanism that is to be rendered operative for a predetermined length of pre-purchased time or for uninterrupted sequential periods of pre-purchased time in accordance with the acceptance of the control unit of one or more coins of predetermined value, and wherein the time purchased after the acceptance of the first coin offered to the coin unit becomes cumulative.

As will become manifest below, the coin-control unit shown in FIGURES 1 to 12, inclusive, may be described as a single-coin multiple-price control unit wherein each coin deposited in and accepted by the control unit gives rise to a specific resulting function. In the preferred example of this embodiment of the invention it could be assumed that the predetermined basic operational time unit to be pre-purchased with the deposit of one dime in the control unit is ten minutes. In the device means are provided for accumulating successive uninterrupted increments of ten-minute operational-time periods with the successive introduction in and acceptance by the control unit of successive dimes. Means are also provided in the control unit for accepting single coins of a value differing from the dime wherein, different and successive intervals of operating time may be purchased and accumulated in the same manner as before, or may be pre-purchased and added to the ten-minute time interval of operation bought through the original dime deposit. For example, the control unit may be constructed in such a manner as to accept single deposits of dimes and quarters, and if the latter coin is deposited within the control unit the device could be so constructed as to provide pre-purchased time for the deposit of a quarter in the amount of one-half hour. Obviously, this same operational time period could be purchased by the deposit of three dimes, but this results in the expenditure of an additional five cents which could be avoided upon the deposit of a quarter. Additional and equal increments of one-half hour time could be accumulated by the device upon the successive deposit of additional quarters.

It will be further understood from the device described below and as illustrated in FIGURES 1 to 12, inclusive, that this control unit has an additional advantage and object in the provision of means for accumulating in the device two differing time intervals of predetermined periods which is achieved through the introduction of dimes and quarters in varying sequential order as, for example, the deposit of two quarters and a dime in any sequential order, or the deposit of seven dimes in order to pre-purchase an operational time of one-hour and ten minutes. Other and differing combinations of coins may be deposited within the control unit in order to obtain operational-time intervals of desired lengths.

In the embodiment of this invention which immediately follows, use is made of a mechanically-operated time-accumulating device driven by an electric timing motor, the time-accumulating device including a non-reset continuous-revolution control ring together with mechanical means cooperating therewith to cause the energization of the timing motor and the de-energization thereof in accordance with the mechanical movement of the ring as controlled by coin-metering means which is incorporated within the unit.

Referring now more specifically to FIGURES 1 to 12, inclusive, of the drawings, these figures illustrate, in detail, a time-accumulator unit constructed in accordance with the teachings of this invention, and in making specific reference to FIGURES 2, 11 and 12, reference numeral 30 denotes a constant-speed electric motor to which is mechanically-connected in the usual manner a speed reducer 32 having a front closure plate 34, and a laterally and forwardly-extending output or drive shaft 36, the motor 30 and speed reducer 32 being conventional in the art and available on the open market.

The time-accumulator unit or device constructed in accordance with this invention is generally designated by the reference numeral 40 (see FIGURES 1, 2 and 12) and is seen to include a substantially hollow cylindrical downwardly-stepped casing 42 (see FIGURES 2 and 12) having a discoidal back or rear wall 44, the back or rear wall 44 being centrally-apertured as at 46 to loosely and rotatably-receive the forward-projecting end of the output or drive shaft 36 therethrough. Forwardly-projecting from the discoidal rear wall 44, at the peripheral marginal edge thereof, is a substantially hollow cylindrical sidewall 48 integrally-formed therewith and which merges, at its outermost forward end, in an integrally-formed, outwardly-extending circumferential flange 50. The cylindrical sidewall 48 and an adjacent portion of the circumferential flange 50, at the respective upper ends, are provided with an arcuate finger-receiving opening 52 and recess 54, respectively, to serve a function to be described and, as seen in FIGURE 12, the inner ends of the opening 52 and recess 54 are in open communication with one another. From the outer peripheral marginal edge of the flange 50 forwardly-projects (see FIGURES 8 and 12) an annular sidewall 56 that terminates at its forward outer end in an outwardly-flaring, integrally-formed, circumferential flange 58. Interposed between the annular sidewall 56 and ears 59, there being a pair, projecting from the front closure plate 34, are a plurality of hollow cylindrical spacer sleeves 60 which receive bolts 62 therethrough that thread into the flange 50 to tightly clamp the discoidal rear wall 44 flush against the front closure plate 34. The annular sidewall 56 is cut-out to form an arcuate slot as at 63 adjacent the lower end thereof (see FIGURE 8) to receive an elongated substantially rectangular microswitch 64 of conventional design having the usual end connectors 66, 68, center connector 70 and a switch-actuating plunger 72. As is seen in this figure, and in FIGURE 2, the microswitch 64 is fixedly-secured to the circumferential flange 58 as by the screws 74.

The outer side of the annular sidewall 56 is axially-grooved externally at 76 at circumferentially-spaced intervals to provide clearance for the screws 78 which extend transversely through openings 79 (see FIGURE 4) formed in the flagne 58 to serve a function to be described; and the flange 58 at its outer peripheral marginal edge is provided with a plurality of circumferentially-spaced inwardly-extending arcuately-shaped access openings 80 (see FIGURES 4 and 8) which also serve a purpose to be described.

In FIGURE 12 it is seen that the horizontal axis of the stepped casing 42 is coincident with the elongated horizontal axis of the output or drive shaft 36, and that a pair of stub axles 82, 84 (see FIGURE 4) have one of their respective ends fixedly-secured to the circumferential flange 50 with the other ends thereof extending perpendicularly and forwardly away therefrom with their respective longitudinal axes being parallel to one another and parallel to the longitudinal axis of the output or drive shaft 36. The axes of the stub axles 82, 84 are preferably displaced slightly to one side of the axis of the output or drive shaft 36. With the longitudinal axes of the stub axles 82, 84 serving as center points, the annular sidewall 56 is provided with a pair of axially-extending outwardly-opening recesses 86, 88, respectively, struck on radii extending therefrom.

Mounted on the stub axles 82, 84, are, respectively, a pair of ratchet pawls 90, 92 comprising an index arm and a trigger arm, respectively. Each pawl arm is bifurcated at one end to give rise to a pair of laterally-spaced and substantially parallel rounded ears 94, 96 (see FIGURE 11) pivotally-mounted on the stub axles 82, 84 with portions thereof being received within the recesses 86, 88. The other ends of the pawl arms 90, 92 extend away from the respective stub axles 82, 84 in a clockwise direction, reference being made to FIGURE 11, and terminate in inwardly-extending and confronting nebs 98, 100, the function of which will be described infra. Mounted on each stub axle 82, 84 between the ears 94, 96 is the central coil portion 102 of a helicoidal spring 104 having an end 106 abutting against the inner side of the annular sidewall 56, and the other end thereof terminating in a laterally-offset tongue 108 overlapping those edges of the pawls 90, 92 confronting the inner side of the annular sidewall 56. Tensioning of the springs 104 is such that the pawls 90, 92 are constantly biased for pivotal movement about their respective stub axles 82, 84 in a counterclockwise direction, reference being had to FIGURE 8 of the drawings.

At 150 is designated, in general, an adjustment wheel or driver rotor which includes the normally vertical flat cylindrical main body portion 152 that is provided with a laterally and rearwardly-extending skirt 154 at its peripheral marginal edge, the skirt 154 confronting the sidewall 48 and being externally-milled as at 156. The adjustment wheel 150 is formed with a centrally-located integral rearwardly-extending hub 158, the main body portion 154 and the hub 158 having an axially-extending continuous bore 160 therethrough. As is seen in FIGURE 12, the output or drive shaft 36 passes through the bore 160 and extends forwardly therebeyond. A set screw 162 is threaded through the hub 158 to engage the shaft 36, thereby securing the adjustment wheel 150 thereto for rotation therewith. Again referring to FIGURE 12, it is seen that the adjustment wheel 150 is of such diameter as to cause a portion of the milling 156 to constantly extend through the opening 52 as the adjustment wheel 150 is rotated to permit digital manipulation thereof to serve a function to be described. Reference will also be made below to the nature and function of the cylindrical pin 164 shown in FIGURES 8 and 12 which projects forwardly from the main body portion 152 of the adjustment wheel 150 adjacent to, but spaced inwardly from the circumferential outer edge thereof.

Reference numeral 200 designates, in general, a substantially cylindrical time-accumulator rotor (see FIGURES 4, 8 and 12) having a centrally-located forwardly-projecting hub 202, the rotor 200 and hub 202 being coaxially-bored at 204 to receive therethrough a forwardly-projecting end of the output or drive shaft 36. The time-accumulator rotor 200 is mounted for free rotation on the shaft 36 and the back face thereof is formed with an integrally-extending discontinuous arcuate slot 206 congruently-located with respect to an adjacent circumferentially-located edge portion 202 of the rotor 200. The adjacent ends of the slot 206 are separated by a radially-extending stop rib 208 (see FIGURE 8). The radius and width of the slot 206, and its position is such as to permit the cylindrical pin 164 to be slidably and rotatably-received therein with the stop rib 208 being disposed in the path of travel thereof to serve a function to be described.

Referring now more specifically to FIGURES 4 and 12, it is seen that the time-accumulator rotor 200, at its forward face and adjacent its outer circumferential marginal edge, is integrally-formed with a plurality of regularly-spaced radially and inwardly-extending slots 210 which give rise to a plurality of equal-sized elements 212 each having equal arcuate outer peripheries 214. The width of the slots and the width of the segments are substantially equal, one with respect to the other. In FIGURE 4, the forward face of the time-accumulator rotor 200 is shown to be divided into eighteen equally-spaced slots 210 to provide eighteen substantially equal segments 212. The length of each segment 212 and the immediately-adjacent slots 210 are precalculated with respect to the r.p.m. of the drive shaft 36. Each segment and slot in this example, it will be understood, will, therefore, cover an arc of substantially 10°. The segments 212, as seen in the drawings, surround the outer portion of the hub 202 in spaced relation relative thereto defining an inwardly-extending continuous cylindrical groove 216 therebetween. The number of slots and segments 210, 212, respectively, is arbitrarily selected in this instance, but may be predetermined depending upon the usage of the time-accumulator units 40. In the present case, and for the purpose of example only, the eighteen slots 210 and the eighteen segments 212 are pre-calculated with respect to the pre-selection of the motor 10 which is of such type as will drive the output or drive shaft 36 one revolution every 180-minutes, hence, in this given example the distance between each slot 210 represents the equivalent of ten-minutes' time; and it will be understood further that with the defined construction, the time-accumulator rotor 200 will turn directly with and at the same speed as the rotation of the shaft 36. In FIGURE 12 it is seen that the outer peripheral side of the time-accumulator rotor 200 confronts the annular sidewall 56 in spaced relation relative thereto, and as shown in FIGURES 4, 11 and 12, the arrangement is such that the nebs 98, 100 are alternately engaged, respectively, with one of the slots 210 and segments 212 as the time-accumulator rotor 200 is set or adjusted and turns with the output or drive shaft 36 to render the unit 40 operative and inoperative as will be explained.

Reference numeral 250 designates (see FIGURES 4, 11 and 12) a substantially cylindrical indexing rotor which is centrally-bored at 252 to receive a forward end portion of the shaft 36 therethrough, the shaft 36 projecting beyond the front face of the indexing rotor 250. The indexing 250 is also counter-bored at 253 to loosely-receive the hub 202 therein. The indexing rotor 250 is mounted for free rotation on the output or drive shaft 36, and one end of a pivot pin 254 extends transversely through the indexing rotor 250 and through the inner end of recess 256 extending inwardly from the outer peripheral edge 257 between the front and back faces of the indexing rotor 250. The opposed ends of the pin 254 are, respectively, flush with the outer front and back faces of the indexing rotor 200.

One end of an indexing ratchet arm or pawl 258 is pivotally-mounted on the pin 254, the other end of the pawl 258 terminating in a neb 260 normally projecting beyond the outer peripheral edge of the indexing rotor 250 for releasable-engagement in the inner open ends of the slots 210 whereby the time-accumulator rotor 200 is locked against rotation in a counterclockwise direction relative to the indexing rotor 250, reference being made to FIGURE 4 of the drawings. Conventional means (not shown) serve to constantly bias pawl 258 for movement about its pivot pin 254 in a counterclockwise direction, reference again being made to FIGURE 4 of the drawings.

To serve a function to be described, one end of a cylindrical rod 262 is fixedly-secured to the indexing rotor 250, the other end thereof projecting forwardly from the front face thereof and substantially normal with respect thereto.

Reference numeral 300 designates, in general, a substantially hollow cylindrical main housing that includes an axially-elongated forwardly-projecting substantially cylindrical sidewall 302. The inner end of the housing 300 is closed by a transversely-extending back or rear wall 304 having a rearwardly-projecting annular centering boss 306 (see FIGURES 3 and 12) adapted to fit against the inner side of the annular sidewall 56 to center the sidewall 302 with respect thereto. The back or rear wall 304 is formed with a plurality of internally-threaded sockets 308 corresponding in number to the number of bolts 62 which are threadedly-received therein to releasably-receive the same whereby the back or rear wall 304 may be drawn tightly against the circumferential flange 58. The sidewall 302 is, at its forward end, formed with a plurality of transversely-extending tapped openings 310 which are aligned with the arcuate access openings 80 to serve a function to be described.

The back or rear wall 304 is irregular in configuration and, reference being made to FIGURES 3 and 12, is seen to include a forwardly-projecting substantially cylindrical boss 312 (see FIGURE 11) disposed in concentric spaced relation relative to the sidewall 302. The rear or back side of the rear wall 304 is provided with a concentric inwardly-extending hollow cylindrical recess 314 that is in open communication with the outer side of a shallow elongated arcuate recess 316 which extends inwardly into the boss 312 from the backside thereof. The inner end of the boss 312 is also formed with an outwardly and rearwardly-opening inlet 318 having an end thereof in open communication with the upper end of the recess 316 (see FIGURE 3) to provide a platform 320 on which is fixedly-connected one end of a perpendicular anchor pin 322 to which further reference will be made below. The boss 312 is also provided with a transversely-extending slot 324 (see FIGURE 11) which extends completely therethrough and which opens into the recess 314 at the backside thereof (see FIGURE 3) and a segment-shaped plateau 326 at its front side (see FIGURE 11).

Referring to FIGURES 11 and 12, and serving a purpose to be made more clear below, it is seen that that portion of the front end of the boss 312 containing the slot 324 is reduced in thickness to form the segment-shaped plateau 326, the ends of the latter being defined by the confronting planar shoulders 328, 330 (see FIGURE 11). The boss 312 and an integral rearwardly-projecting hub 332 (see FIGURES 3 and 11) are coaxially-bored as at 334, the hub 332 journaling for rotation the outer free terminal end of the output drive shaft therein. To serve a function to be described, a stop pin 336 has one of its ends connected to the front face of the boss 312 and its other end projecting perpendicularly therefrom (see FIGURES 7 and 11).

Referring now to FIGURES 11 and 12, the peripheral marginal edge of the boss 312 is seen to be extended forwardly in an integrally-formed arcuate stator 338 of uniform thickness and which extends substantially through an arc of approximately 260-270° with its confronting opposed ends 338A and 338B being substantially coplanar, respectively, with the confronting shoulders 328, 330 at the ends of the plateau 326. To serve a function to be described, the arcuate stator 338 at the exterior side thereof is formed with a plurality of inwardly and axially-extending substantially semicylindrical pockets 340, 342, 344 and 346 (see FIGURES 5 and 11 of the drawings), of which the pocket 340 will be hereinafter denoted as the "zero" pocket, the pocket 342 as the "dime" pocket, the pocket 344 as the "quarter" pocket, and the pocket 346 as the "coin-test" pocket. Each of the pockets 340, 342, 344 and 346 has its respective rearmost end closed by a substantially cylindrical end or closure wall 348, of which one is clearly seen in FIGURE 11.

Serving a function to be described, the stator 338 between the zero pocket 340 and the dime pocket 342 is separated therefrom by an arcuate shoulder 341 less than the thickness of the stator 388, and the dime pocket 342 is separated from the quarter pocket 344 by an arcuate shoulder 343 having a thickness greater than the thickness of the arcuate shoulder 341, but still less than the thickness of the stator 338. The foregoing structure can best be seen in FIGURE 11; the scale of FIGURE 11 makes small differences in thickness not readily visible.

The cylindrical sidewall 302 at the upper and forward end portion thereof is reduced in thickness to form an upwardly-facing flat shoulder 350, and the cylindrical sidewall 302 though the shoulder portion 350 is formed with an inwardly-extending coin-receiving slot 352, the ends of the slot being defined by shoulders 354, 356. A coin-discharge slot or notch is indicated by reference numeral 358, this slot or notch being disposed adjacent the lower end of the cylindrical sidewall 302 and below the coin-receiving notch or slot 352. The ends of the coin-discharge slot 358 are clearly delineated by the shoulders 360, 362.

Projecting perpendicularly from the backside of the boss 312 and at the right-hand side of its vertical diameter as viewed in FIGURE 3, is a rearwardly-extending pivot pin 364 to which is pivotally-connected one end of an elongated substantially flat semicircular lever 366. The inner edge 368 of the semicircular lever 366 is of a length greater than the length of the lower edge of the slot 324 and has an intermediate portion in overlapping coextension therewith. The inner edge 368 of the semicircular lever 366 is provided with a pair of arcuately-shaped recesses 370, 372 intermediate the ends thereof, the recesses being separated, one from the other, as by an outwardly-extending land 374. Referring specifically to FIGURE 3, it is seen that the other or free end of the semicircular lever 366 has a transversely-extending opening 376 formed therein which is connected at one end 378 of a helicoidal spring 380, the other end 382 of the spring being fixedly-connected by conventional means to the anchoring pin 322. As is seen in FIGURES 3 and 12, the helicoidal spring 380 normally extends through the length of the recess 316 and is substantially housed therein.

Reference numeral 400 (see FIGURES 11 and 12) designates, in general, a substantially hollow cylindrical outer rotor, the outer rotor 400 including an annular sidewall 402 coaxially-disposed with respect to the drive shaft 36, and an inwardly-extending substantially annular back wall 404 integral therewith. As is seen in FIGURE 12, the annular back wall 404 surrounds and is mounted on the cylindrical boss 312, and the cylindrical outer rotor 400 is rotatable with respect thereto. The forward end of the annular sidewall 402 is integral with an outwardly-flaring annular flange 406. As is seen in FIGURES 5 and 11, a push-pull pin 408 has an end thereof fixedly-secured to the annular flange 406, and its other end projects forwardly of and is perpendicular to its associated flange.

Integral with the annular flange 406 and projecting rearwardly therefrom in spaced relation relative to the annular sidewall 402 are a plurality of circumferentially-spaced arcuately-shaped outer bearing races 410 (see FIGURE 11), the free ends of which are provided with inwardly-extending U-shaped cut-outs 412 providing arms 414, 416 which are shaped to engage opposed sides of ball bearings 418. As is seen in FIGURE 12, the outer bearing races confine the ball bearings 418 between the annular sidewall 402 and the back or rear wall 304 tracking the same as inner bearing races and supporting the annular back wall 404 out of frictional engagement with the back wall 304. The flange 406 is nested within the sidewall 302 with its edge disposed in confronting relationship relative thereto.

Refering now more specifically to FIGURES 5, 11 and 12, reference numeral 420 denotes an arcuate groove which extends inwardly from a forward end and inner side of the annular sidewall 402 to terminate at its inner end in a spacer shoulder 422 coextensive therewith. The shoulder 422 serves a function to be described. One end of the groove 420 terminates in a shoulder 424 and the other end thereof terminates in a similar second shoulder 426 shown in its normal and inoperative position in FIGURE 11 adjacent to, but spaced from the vertical diameter of the outer rotor 400 at the upper side thereof.

The other side of the shoulder 426 is contiguous to an inwardly-extending arcuate outwardly-opening pocket 428, hereinafter denoted as the "zero" pocket which is formed in the inner side of the annular sidewall 402 and extends axially thereof as does the groove 420 and shoulder 422. The annular sidewall 402 also has extended inwardly from the forward end thereof and at its inner side an axially-extending second arcuate groove 430 having an end thereof separated from the pocket 428 by a shoulder 432, the other end of the groove 430 being intersected by a second inwardly and axially-extending outwardly-opening arcuate pocket 434, hereinafter known as the "quarter" pocket. As is seen in FIGURE 11, the quarter pocket 434 is proximate to, but spaced from the cylindrical push-pull pin 408 and is disposed to one side thereof. Also proximate the push-pull pin 408 and located on the other side thereof is a third similar arcuate pocket 436, hereinafter designated the "dime" pocket. The thicknesses of the several grooves and shoulders, as well as the depth of the pockets all referred to immediately supra, have certain interrelated functions relative to one another and to which more specific reference will be made below.

At 450 is denoted a substantially hollow cylindrical inner rotor ring which includes a substantially hollow cylindrical sidewall 452, and extending transversely through the cylindrical sidewall to open on opposite sides thereof is an axially-elongated transversely-extending slot 454 (see FIGURE 11). At the forward end 453 of the cylindrical sidewall 452 there is formed an inwardly-extending ball seat taking the form of a notch 456 extending transversely through the sidewall 452 and opening on both sides thereof. As is seen in FIGURE 11, the outer side of the cylindrical sidewall 452 is inwardly-tapered toward the notch 456 as at 457 to serve as a seat for one end of an elongated substantially rectangular leaf spring 458 which is rigidly-secured thereto by conventional means (not shown). The other or free end of the spring 458 terminates in an arcuate ball cup 460 opening into and disposed in confronting and open communication with the outer side of the notch 456. To serve a function to be described below, the base wall 462 of the notch 456 is arcuately-shaped and is tapped to receive an adjustment set screw 464 having an end thereof projecting within the notch 456. The notch 456 and the pocket 346 are adapted to receive a coin testing spherical ball 466, and the slot 454 and a predetermined one of the pockets 340, 342, 344, and 428, 434, 436 are adapted to selectively-receive a spherical ball indicated at 468. The ball 466 normally seats in the pocket 344 and partly into the cup 460 making tangential engagement with the aforesaid one end and at one side of the adjustment set screw 464 when inoperative (see FIGURE 9) and seats thereon in its operative position (see FIGURE 10), as will be explained below.

Integral with and projecting inwardly from the inner side of the cylindrical sidewall 452 adjacent the normally-positioned lower end thereof and at its inner side is an inwardly-extending sector-shaped lip 470 (see FIGURE 11) having opposed sides 472, 474. The apex end of the sector-shaped lip 470 truncated and bifurcated to provide a pair of oppositely-disposed arms 476, 477. Fixedly-secured to the front or forward end of the cylindrical sidewall 452 is the outer peripheral edge of a segment-shaped element 478 having an inner arcuate edge 479 and a flat radially-extending end 480. The other end 481 has an inner portion 481A and an outer portion 481B (see FIGURE 5) forming an obtuse angle at their intersection.

As is seen in FIGURE 12, the inner cylindrical rotor ring 450 is mounted over the arcuate stator 338 in congruent relation relative thereto and in congruent confronting relation relative to the annular sidewall 402. In FIGURE 12, the ball 468 is shown as being disposed within the pocket 340 in a neutral or zero position with the upper portion thereof being engaged within the slot 454. In assembly, the sector-shaped lip 470 is seen to be juxtaposed against the segment-shaped plateau 326 with the side 474 normally abutting against the shoulder 330.

The arcuate stator 338 is purposely constructed with a cut-out portion between the shoulders 338A, 338B in order to accommodate the sector-shaped lip 470 during its assembly with the other of the component elements of the invention described above, and in order that the time-accumulator device 40 accomplishes the desired objectives, it is necessary that the arcuate stator be substantially complete to form a complete circle; to that end, there is provided an arcuate flange 500 (see FIGURE 11) having a substantially L-shaped configuration including the axially-extending leg portion 502 and the laterally and outwardly-extending foot portion 504. The remotely-disposed ends of the arcuate insert 500 are adapted to be releasably-seated in overlapping relation within sockets 506, 508 (see FIGURE 11) formed in the adjacent ends of the arcuate stator at 338.

Reference numeral 600 (see FIGURES 7 and 11) generally indicates a winged rotor ring having a substantially solid cylindrical main body portion 602. The back face or rear side of the main body portion 602 has an inwardly-extending concentric arcuate recess 604 formed therein having opposed ends 604A, 604B. The cylindrical main body portion 602 is centrally-bored at 606 and is counter-bored at 608 to serve functions to be described. The bore and counterbore 606, 608, respectively, are concentric with respect to the arcuate recess 604.

Projecting outwardly from the outer end of the rotor ring 600 and integrally-formed therewith is a substantially sector-shaped wing 610 (see FIGURES 5 and 11) which extends outwardly from the front side of the main body portion 602 and from points spaced from, but adjacent to the counterbore 608 and to and beyond the outer peripheral edge thereof. As is seen in the figures of the drawings, the wing 610 is provided with a substantially straight side 612 and an opposed outwardly-bowed side 614. A slot 616 extends from the outer periphery of the wing 610, and the inner apex end of the wing 610 is arcuately cut-out as at 618.

The winged rotor ring 600 is disposed within the annular sidewall 338 of the stator 300, and in this position the straight side 612 confronts the straight side 480 of the sector-shaped lip 478. As will be seen below, the winged rotor ring 600 is rotatable between the opposed ends of the sector-shaped element 478. With the winged rotor ring 600 assembled in the manner described, the arcuate recess 604 receives the pin 336 therein, the pin 336 being disposed within the path of movement of the opposed ends 604A, 604B and serves a function to be described.

From the drawings it is seen that the bore 606 and the counterbore 608 are coaxially-aligned with the output or drive shaft 36 and the bore 334, but neither the bore 606 nor the counterbore 608 receives the drive shaft 36 therein.

In FIGURE 11, reference numeral 700 denotes, in general, a gear shaft having an elongated smooth inner end portion 702 and an enlarged outer end 704 in the form of a spur gear 706. Integral with the gear shaft 700 and immediately adjacent the inner end of the gear 706 is a flat disc 708 having a radially-extending flat actuating lever 710 projecting therefrom. Integral with the disc 708 and extending inwardly therefrom is a hollow cylindrical hub 712.

As is seen in FIGURE 12, the inner portion of the shaft 702 extends through the bore 606, counterbore 608, and the bore 334 in confronting relation relative to the outer end of the output or drive shaft 36, the inner end of the hub 712 being seated in the counterbore 608 with the actuating lever 710 being adapted to rotate relative to the cylindrical main body portion 602 in wiping engagement with the outer face thereof and with the opposed sides 714, 716 of the lever 708 being movable between the bowed side 614 and the opposite end 612 of element 600. The outer end of the lever 710 turns in close proximity to the inner edge 479 of the element 478 to sweep the same.

Referring now to FIGURES 1, 2, 11 and 12, reference numeral 800 designates, in general, a front cover plate for the coin-accumulator device 40. As is seen in the several figures of the drawings, the front cover plate 800 is substantially cylindrical in configuration and is provided with a plurality of circumferentially-spaced internally-threaded openings 802, the openings 802 being located in the cover plate 800 at points corresponding to the openings 310 formed in the cylindrical sidewall 302. The cover plate 800 is releasably-secured to the cylindrical sidewall 302 by means of the screws 804 which extend through the openings 310 for threaded-engagement within the openings 802.

The back side of the cover plate 800 is formed with an upper cavity 806 with a diameter thereof being substantially coincident with the vertical diameter of the cover plate 800 as represented in FIGURE 6, and as is seen in this last-named figure, the lower end of the cavity 806 is in open communication with a second cavity 808 adjacent the upper end thereof, the second cavity 808 also having a diameter coincident with the vertical diameter of the cover plate 800 and is disposed substantially at the center point of the cover plate 800 to serve a function to be described. A transversely-extending opening 814 is also provided, the opening 814 extending transversely through the cover plate 800 and through an embossed portion 810 thereof disposed at the upper end thereof. The upper peripheral edge of the front cover plate 800 is formed with an upwardly-facing flat shoulder 812 which falls in the same plane as the shoulder 350 when the device or unit 40 is fully assembled.

Reference numeral 900 denotes, in general, a manually-operable knob having a forwardly-disposed end wall 902 which extends across the forward end of the substantialy hollow cylindrical sidewall 904. Centrally of the end wall 902 and at the inner side thereof is an elongated laterally-projecting substantially hollow cylindrical boss 906 coaxially-disposed with respect to the cylindrical sidewall 904. The boss 906 is adapted to receive therein one end of an elongated shaft 908 secured therein by a set screw 910 which passes transversely through the boss 906. The other end of the shaft 908 projects through and is rotatably-received within the opening 814 formed in the front cover plate 800 and into the cavity 806. This end of the shaft 908 has a spur gear wheel 911 fixedly-secured thereon for rotation therewith. As is clearly shown in FIGURE 12, the spur gear wheel 911 is meshed with the spur gear 706 when the handle or knob 900 is assembled on the front cover plate 800.

Reference numeral 912 indicates a coil spring under tension, the spring having its inner end secured by a screw 914 to the boss 906. The other or outer end of the spring 912 is fixedly-secured to one end of a pin 914 which projects forwardly from the embossed portion 810 of the front cover plate 800. The spring 912 is so tensioned that it is "wound" when the knob or handle 900 is rotated in a clockwise direction.

Reference numeral 1000 denotes a substantially rectangular flat thin, substantially rectangular mounting plate for the time-accumulator unit 40. As is seen in FIGURE 2 of the drawings, the back side of the time-accumulator unit mounting plate 1000 is formed with an integral arcuate flange 1002 which circumscribes an opening 1004 formed in the mounting plate 1000 and which receives the unit 40 therethrough. Any suitable means may be employed to secure the mounting plate 1000 and its flange 1002 on the cylindrical sidewall 302. As is seen in FIGURES 2 and 12, the upper portion of the mounting plate 1000 is disposed substantially adjacent the shoulder 350 and the mounting plate 1000 and its flange 1002 are downwardly and forwardly-inclined with the lower confronting end portions 1005, 1006 of the flange 1002 extending substantially to the shoulders 360, 362 to define a slot 1008 aligned with the coin-discharge slot or notch 358. Screw or bolt-receiving openings 1010 extend transversely through the plate 1000 to afford means for connecting the same to a backboard (not shown) of a machine, the time operation of which is to be controlled by the device or unit 40.

In operation, and assuming that the time-accumulator device or unit 40 has been mounted on the dashboard of a machine (not shown) to be operated, the component elements of the device or unit 40 are in their respective positions substantially as shown and described. Bearing in mind that the unit 40 as described and illustrated herein is adapted to operate upon the insertion of either of two coins (a dime or a quarter) and to accumulate operating time as subsequent coins of either denomination of the two pre-selected coins are deposited in any desired order, the device 40 is operated as follows.

Upon installation of the time accumulator 40 as assembled and described above, the control ball 468 is seated in the zero pocket 340 of the stator 300 with the zero pocket 428 of the outer rotor 400 aligned therewith. The coin-testing ball 466 will be disposed in its unseated position relative to the adjustment screw 464 in the manner shown in FIGURE 9. The installing mechanic now digitally manipulates, if necessary, the driver rotor 150 until the cylindrical pin 164 abuts the stop rib 208. This will represent the zero setting for the device or unit 40. The fixed cylindrical stop pin 336 is, at this time, located substantially at or in the end 604A of the recess 604 formed in the main body portion 602 of the winged rotor ring 600.

Let it be assumed that the operator of the unit 40 deposits a coin such as, for example, a quarter in the coin-receiving slot 352. The coin will now drop downwardly therethrough and will slide across an upper portion of the annular flange 406 on which it is supported, and will slide across the forward end 453 of the inner rotor ring 450 and the forward end of the arcuate stator 300. The coin will eventually come to rest in tangential relation on the outer end of the flat lever 710 and on an adjacent point of the bowed side 614 of the segment-shaped wing 610. The bowed side 614 of the segment-shaped wing 610, is when at rest, disposed immediately adjacent the shoulder 356 defining one end of the coin-receiving slot or notch 352, but the wing 610 does not, in any manner, block this slot. In this position, a portion of the coin projects above the flat shoulders 350, 812 making possible digital grasping of the coin to effect the removal thereof should it be desired to do so prior to the operation of the unit 40.

The operator now grasps the knob 900 and turns it clockwise. This causes the coil spring 912 to wind, increasing the tension thereon, and simultaneously turns the shaft 908 in the same direction. This, of course, causes the spur gear 911 to also turn clockwise and to turn the spur gear 706 in the opposite or counterclockwise direction. Since the lever 710 is integral with the spur gear 706, it, too, will turn in a counterclockwise direction away from the bowed side 614 of the segment-shaped wing 610. As the lever 710 still moves, the coin slides downwardly under the force of gravity against the shoulder 354, the side 716 of the lever 710 and the bowed side 614 of the segment-shaped wing 610 until the side 716 approaches and passes through a turning arc of substantially 45° at which time the coin will move to abut against the flat disc 708, having passed the shoulder 354, and will move away from the bowed side 614 to ride down the side 716 of the lever 710 and downwardly along an upper inner side portion of the sidewall 302 of the main housing 300. As the handle or knob 900 is continued to be turned in the named direction, the coin continues its descent between the side 716 and a now inner side portion of the sidewall 302 confronting the same until the coin comes to rest on the end portion 481A of the segment-shaped element 478 where it temporarily remains.

At this point it should be noted that the inner rotor ring 450, when in its normal inoperative position, has the segment-shaped element 478 thereof disposed substantially in confronting relationship relative to the discharge slot 358 and effectively blocks the same against the passage of a coin therethrough. At the same time, the end 481 of the segment-shaped element 478 is positioned immediately adjacent and below the semicylindrical pocket 346 which holds the spurious coin-detecting ball 466.

At the same time the coin seats against the end portion 481A, the lever 710 is sweeping the inner edge 479 of the segment-shaped element 478 and continues its movement until the side 714 of the lever 710 engages the straight side 612 of the segment-shaped wing 610.

As these series of movements take place, no other mechanical movements occur in the device 40. Now, however, as the lever 710 engages the wing 610 and the operator continues the clockwise turning of the handle or knob 900, the lever 710 and the wing 610 turn together, and since the push-pull pin 408 extends into the slot 616 of the wing 610, the cylindrical outer rotor 400 to which the pin 408 is connected, will turn in the same direction and simultaneously with the wing 610.

It will be recalled that in the zero or initial nonoperating positions of the elements of the unit 40, the pocket 340 falls on and remains fixed on the vertical diameter of the stator sidewall 338 and that the slot 454 of the inner rotor ring 450 is superimposed thereover. Also, in this zero or non-operating condition of the component elements of the device 40, the arcuate pocket 428 of the outer rotor wing 400 overlies the slot 454, and that in the zero or starting positions of the elements of the time accumulator 40, the ball 468 rests in the pocket 340.

The lever 710 in its aforesaid continued turning portion of the operating cycle turns the wing 610 (and simultaneously the outer rotor ring 400) to cause the bowed side 614 of the wing 610 to engage tangentially an adjacent portion of the inserted coin which now tangentially rests, as described above, on the end 481A and an adjacent portion of the inner side of the sidewall 302. As this turning movement of the outer rotor ring 400 and the winged rotor ring 600 takes place, the pocket 424 is moved out of alignment with the slot 454 and the ball 468 resting in the zero pocket 340, and the groove 430 is presented in its stead.

It now becomes important to re-examine and re-emphasize the condition of the device 40 at the precise time the bowed side 614 makes contact with the deposited coin which, in this instance, is considered to be a perfect quarter, for this condition becomes one of the key points of the invention which is repeated in variations that follow. It being understood that the inner rotor 450 must be rotated to unblock the coin-discharge slot 358, the quarter pocket 434 must be formed in the outer rotor 400 at an exact predetermined arcuate distance from the zero pocket 340 so that when the bowed side 614 engages the adjacent side of the deposited perfect quarter, the quarter pocket 434 is exactly aligned with the control ball 468 in its zero pocket 340 formed in the stator 338.

If the diameter of the coin deposited is that of the perfect or standard quarter, plus-or-minus a predetermined tolerance of 0.0002 of an inch, for example, the bowed side 614 of the wing 610 will engage the coin exactly at the time the quarter pocket 434 is aligned with the control ball 468 as deposited in its zero pocket 340. Now, continued movement of the outer rotor 400 moves the deposited quarter together with the inner rotor 450 and the segment-shaped element 478 against which the quarter abuts simultaneously, and the inner rotor 450 will then force the control ball 468 upwardly out of the zero pocket 340 to ride on the shoulder 341, into and out of the pocket 342 to ride on the shoulder 343 for eventual deposit in the pocket 344. It will be understood that while the thickness of the shoulder 343 is greater than the thickness of the shoulder 341, the depth of the quarter pocket 434 is such as to accommodate the control ball 468.

The segmental element 478 has now been moved from across the coin-discharge slot 358 and due to the shape of the end 614 of the wing 610 and the angle of inclination of the end 841A, the quarter is squeezed or forced downwardly through the slot 358 for collection in a suitable container (not shown). The squeezing action is achieved through the continued turning of the handle or knob 900 which causes the outer rotor ring 400 to continue its turning movement to present the groove 435 to the control ball 468 while it remains deposited in the quarter pocket 344, and then subsequently, the pocket 436 until the shoulder 437 makes engagement with the protruding portion of the control ball 468. At this point, no further rotation in this one direction is permitted by the outer rotor ring 400 relative to the inner rotor ring 450.

As has been stated above, the position of the quarter slot 434 is most important relative to the operation of the device 40. The above-described operation of the device 40 will take place if the deposited coin has the exact standard dimension or if the diameter thereof is within any arbitrarily set tolerance. For example, if the diameter of the deposited coin or slug is greater than that of the standard quarter, the bowed side 614 of the wing 610 will make premature tangential engagement with the deposited coin as the handle is turned, whereby the segment-shaped element 478 and the inner rotor 450 will turn counterclockwise, reference being made to FIGURE 5, with no relative movement therebetween, and the control ball 468 in attempting to climb the adjacent sidewall of the zero pocket 340 for movement toward the dime pocket 342 will jam against the adjacent side of the groove 340 since the pockets 340 and 434 are misaligned. This effectively stops the movement of all parts which would normally move in the presence of a quarter having the standard diameter. The jammed action takes place for the distance between the shoulder 341 and the adjacent side of the groove 430 is less than the diameter of the control ball 468.

Now, if it be assumed that a dime of standard diameter is deposited through the slot 352, it too, will eventually come to rest on the side 481A of the segment-shaped element 478 in the manner described above. With the component elements of the control device 40 at their zero or inoperative positions, as described above, the operator to effect operation of the control device 40 will grasp the handle or knob 900 to turn the same in a clockwise direction. The wing 610 will advance toward the adjacent edge of the deposited coin in the same manner as described supra, and in so turning, will cause rotation of the outer rotor 400 simultaneously therewith in order to position the dime pocket 436 in alignment with the zero pocket 340. If the deposited coin is of the proper diameter or within the specified tolerances, this alignment will take place and further rotation of the handle 900 will cause the outer rotor 400 and the inner rotor 450 to rotate in the same direction relative to the stator 338. In making this movement, the inner rotor 540 will force the control ball 468 to climb upwardly of the side of the pocket 340 adjacent the shoulder 341 and to seat within the dime pocket 436 as the control ball is moved to the dime pocket 342 of the stator 338. It will be understood that the groove 435 formed in the outer rotor 400 is of such depth as to permit the turning of the outer rotor 400 to its defined position without jamming with the control ball 468 while seated in the zero pocket of the stator 338.

When the control ball 468 reaches the dime pocket 342 of the stator 338 with the dime pocket 436 of the rotor 400 aligned therewith, no further movement of the inner and outer rotors may take place since the control ball 468 in attempting to climb the sidewall of the pocket 342 toward the shoulder 343 is jammed between this shoulder and pocket 436 as the dimension of the control ball 468 is greater than the dimension between shoulder 343 and dime pocket 436.

It will be understood that as the inner and outer rotors 450, 400, respectively, move together with the deposited dime, the segment-shaped element 478 is also turned to unblock the discharge slot 358 whereby the dime may be ejected therethrough in the manner described above. Since the dime has a smaller diameter than a quarter, it is unnecessary that the segment-shaped element 478 move the full distance it would normally move had a quarter been deposited in order to permit the dime to be ejected.

Now, if a spurious coin or slug should be deposited through the slot 352 to come to rest on the end 481A, and this coin has a diameter greater than the dime, but less than that of a quarter, the end 614 of the wing 610 will engage the adjacent side or edge of the spurious coin at a time when neither the pocket 434 nor 436 are aligned with zero pocket 340, and the inner rotor ring 450 will attempt to force the control ball 468 upwardly out of the zero pocket 340 toward the shoulder 341 and toward the contiguous quarter pocket 342, but will be prevented from so doing since the distance between the adjacent shoulder and groove 431, 435, respectively, is less than the diameter of the control ball 468 and a jamming action will, consequently, take place, preventing the simultaneous movement of the outer rotor ring 400, the inner rotor ring 450, and the coin.

If an improper coin or slug is deposited in the control device 40 which has a diameter less than the diameter of the dime, two control factors take over to prevent the operation of the device 40. First the dime pocket 436 would pass and be misaligned with the zero pocket 340 before the edge or side 614 of the wing 610 makes engagement with the last-mentioned spurious coin and when such engagement is made, the inner rotor 450 in turning to move the control ball 468 out of the zero pocket 340 and over the shoulder 341 would become jammed against the adjacent side of the outer rotor 400 thereby effectively preventing the simultaneous rotation of the outer rotor 400 and the inner rotor 450. Even if this rotation were obtained to a limited degree, since the diameter of the spurious coin is less than that of a dime, the segment-shaped element 478 would not move a sufficient distance when pushed by the coin to move to a new position wherein it would not obstruct the discharge slot 358.

If, for any reason, a coin is not accepted by the control device 40 and has been deposited through the slot 352, the operator may recover the same by releasing the control knob 900 after initially turning the same in a clockwise direction, thereby permitting the coil spring 912 to "unwind" and drive the gear shaft 700 in the reverse direction causing the side 716 of the lever 710 to push against the adjacent side of the coin and to return the same upwardly against the bowed side 614 of the wing 610 which has now returned to its zero position. The coin may come to rest on the upper end of the lever 710 or may, by virtue of the force exerted thereon by the lever 710, strike against the bowed side 614 of the wing 610 with such force as to cause the same to become deflected and ejected through the coin-deposit slot 352.

In the initial or zero and non-operating positions of the component elements of the device 40, the side 474 of the sector-shaped lip 470 abuts against the shoulder 330 of the boss 312, and as the inner rotor ring 450 now rotates upon the deposit of a coin of the proper diameter (a quarter), the side 474 is now swung away from and rotates with the outer rotor 400 and the winged rotor ring 600 until the side 472 of the sector-shaped lip 470 strikes the shoulder 328 which limits further rotation of the inner rotor 450. When element 470 is at zero position, side 472 is adjacent to 328 and 474 is approximately 30° away from 330. Therefore, when activated, 474 moves counter-clockwise towards 330 and, upon return action 472 moves clockwise towards 328. It is precisely at this time that the outer rotor 400 and the inner rotor 450 have completed their simultaneous movement, one with the other, and the segment-shaped element 478 has been moved to completely unblock the discharge slot 358.

The rod 262 which extends from the cylindrical indexing rotor 250 and forwardly between the arms 476, 477 is swung therewith with the rotation of the inner rotor 450 and, in the case of the deposit of a quarter, the rod 260 moves from its normal inoperative position at the lower end of the slot 324 (see FIGURE 3) to the upper end thereof and in so moving, turns the indexing rotor around the drive shaft 36 through an arc of equal length causing, in this case, the neb 260 of the indexing ratchet arm or pawl 258 to travel over the inner ends of three segments 212 and to lock behind the third one thereof. In other words, and under the described construction, the neb 260 has turned through an arc of 60°. Now, as the rod 260 turns, it moves from the recess 372 of the lever 360 and across its inner edge 368 to seat within the recess 370 where the pin 260 is held against inadvertent displacement by the lever 366 under the influence of the spring 380.

All of the parts of the time-accumulator assembly are now at rest and, referring to FIGURE 4 of the drawings, the neb 100 of the arm 92 rests on the outer surface of one of the elements 212 closing the switch 64 and, as has been previously stated, the neb 98 of the arm 90 rests behind one of the elements 212 and in an adjacent one of the slots 210.

The operator now releases the handle or knob 900 which, under the tension of the spring 912, "unwinds" and in so unwinding drives the shaft 908 in the counterclockwise direction. The gears 911, 706 now cooperate to turn the shaft 700 in the opposite direction, turning the lever 710 simultaneously therewith, and the latter sweeps back across the inner edge 479 of the segment-shaped element 478 and the side 614 strike against of the side 612 of the wing 610 to force the winged rotor ring 600 to turn in the same direction. As the winged rotor ring 600 turns, its driving force is transmitted back through the push-pull pin 408 to the outer rotor 400, and since the control ball 468 interlocks the inner rotor ring 450 with the outer rotor ring 400, the inner rotor ring 450 will also rotate in the same direction. Bearing in mind that the rod 262 is now in that end of the slot 324 adjacent the recess 370 at one end of the lever 366, this last turning movement of the inner rotor ring 450 will cause the pin 262 to be displaced from the described end of the slot 324 to resume its position at the other end thereof shown in full lines in FIGURE 3 immediately adjacent the recess 372 formed in the lever 366.

At this instant, the quarter pocket 434, the control ball 468, and the zero pocket 340 are again aligned, but the outer rotor ring 400, under the influence of the spring 912 continues to rotate until once again its zero pocket 432 moves into alignment with the control ball 468 as it stands deposited in the zero pocket 340 of the stator 338. The device 40 now stands ready to accept additional coins such as quarters or dimes in the manner described above.

It will be here noted that the return movement of the sector-shaped element 470 is stopped upon re-engagement of the side 474 thereof with the shoulder 330.

In the re-set condition of the control device 40, the neb 260 of the pawl 258 has re-engaged behind one of the sector-shaped elements 212 and if, by way of example, a dime is now deposited in the slot 352 and the knob 900 again actuated, the sequence of events take place as described above with the exception that in this instance, the throw of the inner rotor ring 450 is less than its throw when a quarter is inserted within the device 40, and the inner rotor ring 450 in turning will cause the rod 262 to move a lesser distance out of its position in the slot 324 as shown in full lines in FIGURE 3, and in this case, the rod 262 is held against over-throw by virtue of the force exerted thereon by the lever 366 under the tension of the spring 380. Of course, the other factors limiting the movement of the inner rotor ring 450, as stated above, also serve to prevent the over-throw of the pin or rod 262.

For the purpose of clarity, it is deemed advisable to describe the operation of the time-accumulator rotor 200 with more particularity in order that its relationship with respect to the other component elements of the control device 40 may be readily understood. Thus, and referring more specifically to FIGURE 4 of the drawings, the indexing operation has been completed and the switch-actuating plunger 72 has been moved downwardly to close the switch 64 through the pivotal movement of the ratchet pawl or arm 92. The indexing operation has turned the indexing rotor 250 to cause the rib 208 to move in an arcuate direction 60° away from the pin 164. The switch 64, in closing, has caused the energization of the motor 30 which turns the drive shaft 36, and since the adjustment wheel or driver rotor 150 is fixedly-secured on the drive shaft 36 and is integrally-connected with the pin 164, the latter will turn in a direction toward the rib 208. At the end of thirty minutes, according to the example given, the rib 208 will be engaged by the pin 164, and since the rib 208 is an integral part of the time-accumulator rotor 200, the rotor 200 will be forced with the shaft 36 causing that element 212 engaged by the neb 100 to move from engagement therewith and for insertion into the adjacent one of the slots 210. This movement of the neb 100 and the corresponding movement of its ratchet arm or pawl 92 causes the switch 64 to open and thereby de-energize the motor 30.

In the example given, the indexing will always take place in increments of one or three of the elements 212 depending upon the value of the coin deposited and the on-off period of time for the motor 30 is dependent upon the width of the upper periphery of one of the elements 212. This holds true whether one or a plurality of coins of the same or differing denominations are deposited within the control device 40.

In the given example, each of the elements 212 is equivalent to an arcuate distance of 20° as is the spacing between each adjacent one thereof. Thus, for consecutive deposits of three dimes we have a substantially continuous operation of the unit 40 for a period of thirty minutes whereas, the same time may be bought for a deposit of twenty-five cents (a quarter) representing a saving to the operator in the amount of five cents.

Obviously, more-or-less pockets may be formed in the outer rotor ring 400 and the stator 338 and the spacing and the number of grooves and shoulders between adjacent pockets may be made to accommodate coins of denominations other than those offered in the specific example and in various combinations thereof. These variations would be made by the manufacturer to accommodate the use to which the control device 40 is to be employed.

The above description relates the nature and function of the device and takes into consideration means which become operative to prevent the operation of the control device 40 upon the insertion of a coin which fails to have a diameter within given tolerances. The tolerances suggested above are arbitrary and may be changed at the will of the manufacturer. But in addition to these safeguards for the coin-control device 40, means are provided which render the device inoperative if the coin, spurious or otherwise, is received within the device 40. Reference is made in this connection to the detecting means shown in detail in FIGURES 5, 9 and 10.

As any coin or slug is deposited within the device 40, the leading edge thereof in approaching the end 481 of the segment-shaped element 478 will pass over the ball 466 which is normally disposed to one side of the screw 464. Now, the edges of all coins minted in the United States are formed with a small raised peripheral rib 1050 (see FIGURE 10), the rib being in the order of several thousandths of an inch. For the most part, it may be stated that practically all foreign coins and slugs are formed without this rib, the obverse and reverse sides thereof being substantially planar, especially these sides of a slug.

The function of the spherical ball 466 is to detect foreign coins or slugs and to render the device 40 inoperative if the deposited coin has a thickness greater than a predetermined thickness represented by the distance between the planar back or rear side of the front plate 800 and the adjacent side of the outer rotor ring 400. In this connection it should be noted that those sides of the inner rotor ring 450 and the stator 338 are substantially coplanar. The depth of the pocket 346 receiving the test ball 466 and the diameter of the test ball 466 is such that the apex of the ball 466 is substantially tangential to the common plane of the outer sides of the outer rotor 400, the inner rotor 450, and the stator 338. The width of the pocket 346 is such that a portion of the test ball 466 protrudes laterally through the open side of the pocket 346 that confronts the leaf spring 460 and is disposed in the path of movement of the shoulder 346A at that side of the pocket 346 remotely-disposed with respect to the end 481 of the segment-shaped element 478. The leaf spring 460 normally confines the test ball 466 within its test pocket 346.

Now, as a coin is deposited in the control device 40 and falls downwardly therein in the manner described to come to rest on the end 481A, the raised rib 1050 of the coin 1052 and the adjacent portion of the coin 1052 will freely pass across the test ball 466. Now, however, as the winged rotor ring 600, its wing 610, the outer rotor 400 and the inner rotor 450, together with the deposited coin 1052 move to position the coin above the discharge slot 358, the end or shoulder 346A of the inner rotor ring 450 abuts the test ball 466 and forces the same to engage and ride outwardly on the shoulder 346B against the tension exerted by the leaf spring 460 to take its seated position on the upper end of the adjustment screw 464. This upper end of the screw is preferably concave, as is indicated at 464A. The upper end 464A of the screw 464 is raised above the bottom of the test pocket 346 and, consequently, when the ball 466 is seated on the upper end 464A of the screw 464, its outer apex is raised above the common plane defined above. The outer apex of the test ball 466 will make tangential contact with either the obverse or reverse sides of the coin 1052 which are recessed below the outer raised rim or rib 1050 thereof. If this condition between the coin being tested and the test ball 466 is maintained, the control device 40 will operate in the manner described above.

However, let it now be assumed that a slug or spurious coin is substituted for the coin shown in FIGURES 9 and 10, and that the spurious coin has a substantially uniform thickness throughout. Let it further be assumed that the thickness of the deposited coin is the thickness as measured between the parallel and laterally-spaced planes containing the outer edges of the ribs 1050 at the obverse and reverse sides of the coin 1052. If this be the case, then the spurious coin will, of course, pass the exposed apex end of the test ball 466 and will come to rest on the end 481A of the segment-shaped element 478, as before. Now, however, as the end or shoulder 346A is moved with the inner rotor ring 450 in the manner described supra, it engages the protruding portion of the test ball 466 and forces the same outwardly of its pocket 346 in exactly the same manner as described above. In this instance, however, since the thickness of the spurious coin of the type described is uniform, the spherical ball 466 will find no concavity in which to ride and will, therefore, jam against the back or rear side of the spurious coin forcing the outer side thereof into frictional contact with the adjacent side of the face or cover plate 800. This effectively wedges the outer and inner rotor rings 400, 450, respectively, and there can be, therefore, no movement thereof tending to cause the segment-shaped element 478 to move away from its blocking position across the discharge slot 358 in the manner described, had the proper coin been deposited.

Release of the handle 900 to permit the coil spring 912 to unwind causes the lever 710 to strike against the improper coin and to force the same upwardly for ejection in the manner described.

To utilize the control device 40, a conventional source of E.M.F. (not shown) is employed, the source having one of its sides grounded. The other side of the E.M.F. source is connected through wire 1500 withone side of the switch 64. The other side of the switch 64 connects through wire 1502 with one side of the motor 30, the other side of the motor being grounded through wire 1504. The aforesaid other side of the switch 64 also connects through wire 1506 with one side of an electrical circuit (not shown) which may include the motor of an electrically-operated drier or other device, the length of time of operation of which is to be controlled by the time-accumulator device 40, and the other side of the electrical circuit is, of course, grounded to complete the circuit.

Aside and apart from control features recited above, and in order to prevent an over-throw of the winged rotor ring 600 when using coins smaller than a quarter, the pin 336 is so positioned within the slot 604 of the main body portion of the winged rotor ring 600 so as to cause the engagement of the pin 336 against the end 604A of the slot 604.

FIGURES 13 to 24, inclusive, illustrate a second embodiment of this invention wherein substantially the same operating principle is carried over from the embodiment of the invention illustrated in FIGURES 1 to 12, inclusive. The second embodiment of this invention illustrates a device operating on the basis of a multi-coin, multi-price combination wherein the control device becomes operative upon the deposit of one or more coins. Here, again is is repeated the basic elements comprising a fixed stator, an inner and outer rotor ring, respectively, and a coin-reject rotor or lever. While the disclosed original embodiment of this invention dwells at some length upon the measurement of coins having diameters within certain permitted tolerances, the actual distance measured by the side 614 and 481A is that of a chord of the coin which would, of course, vary as the diameter of the coin presumed to be completely cylindrical varies. So, here, too, and repeated in this embodiment of the invention, is the measuring concept of determining the length of a chord of a deposited coin or the equivalent thereof in the case of a plurality of coins to effect the required degree of alignment between elements of the stator and inner and outer rotors before the device becomes operative. The embodiment of the invention illustrated in FIGURES 13 to 24, inclusive, may be employed as a control device for practically any type of mechanical or electrical mechanism conceivable.

The embodiment illustrated in the last referred to figures is specifically directed to a mechanism especially designed to provide the retailer of a product or a mechanism for rendering services with a coin-controlled device which may be pre-set by the owner to operate upon the deposit of coinage representing in value one of two predetermined prices depending upon the nature of the product or the services being offered. At the same time, the embodiments of FIGURES 13 to 24, inclusive, illustrates means whereby coins may be accepted within the control device in any combination. For example, the device or unit could be constructed so as to become operable when it has received coinage in the amount of twenty-cents, and the combination of coins could comprise a deposit of four nickels (the example illustrated), one dime and two nickels, or two dimes. The control device of the second embodiment of this invention also includes means for changing the first predetermined price of twenty cents to a lesser value such as, for example, ten cents and wherein the control device may be made to become operative upon the deposit of one dime, or two nickels, optionally.

Referring now more specifically to the second embodiment of this invention illustrated in FIGURES 13 to 24, inclusive, reference numeral 2000 denotes, in general, a coin-control unit or device which is so constructed that only upon the introduction of a coin or a combination of coins totaling one of two predetermined values will the coin-control unit operate after the unit has been set to accept coinage in either of the two values. The coin-control unit 2000 is seen to include an outer substantially hollow cylindrical main housing 2002 which includes an annular sidewall 2004 having a discoidal back wall 2006. The sidewall 2004 projects forwardly from its back wall 2006 and has integrally-formed therewith an outwardly-stepped collar 2008, adjacent its outer or forward end 2010. The collar 2008 has a downwardly and forwardly-inclined planar back side 2012. The forward end of the collar 2008 terminates in a substantially flat mounting flange 2014 having laterally-spaced front and back planar sides or faces 2016, 2018 which are disposed parallel to the outer or forward end 2010. The axes of the collar 2008 and the flange 2014 are coincident and are disposed at an acute angle with respect to the normally horizontal axis of the housing 2002 whereby the unit 2000 may be installed on an inclined mounting board 2020 (see FIGURE 15) of the device (not shown), the unit 2000 is to control. As is seen in FIGURES 15 and 16, the collar 2008 at the lower end thereof is formed with a forwardly-protruding arcuate lip 2022 adjacent the flange 2014. The flange 2014 is provided with a plurality of transversely-extending circumferentially-spaced openings to receive mounting screws (not shown) therethrough to secure the unit 2000 on the board 2020.

The discoidal back wall 2006 is integrally-formed with a forwardly-projecting cylindrical boss 2026 having a forwardly-projecting integral hollow arcuate sidewall 2028 at its circumferential marginal edge, the arcuate sidewall 2028 being disposed in inwardly-spaced and concentric relation relative to the annular sidewall 2004.

As is seen in FIGURES 16 and 24, the back wall 2006 and the boss 2026 have a transversely-extending arcuate slot 2030 formed therein located between the sidewall 2028 and a transversely-extending normally horizontal central bore 2032. The confronting ends of the sidewall 2028 are axially and inwardly-grooved to form a pair of tracks 2034, 2036, the function of which will be described infra. The arcuate sidewall 2028 at its outer and upper side is formed with an upwardly-opening axially-extending pocket 2037 which is divided intermediate its opposed ends by a divider wall 2038 to form inner and outer pockets 2039, 2040, respectively, each of which will hereinafter be referred to as the "control" pocket.

Extending laterally from the back wall 2006 adjacent the upper end thereof is a laterally and outwardly-extending substantially rectangular stop lug 2042 (FIG.

14), and the back wall 2006 is formed with an assembly opening 2044 having an upper portion extending above the sidewall 2028 (see FIGURES 16 and 24). The opening 2024 confronts the inner ends of the tracks 2034, 2036 and is of such size as to cause the opening 2044 to span the tracks 2034, 2036 all to serve a function to be described. Disposed between the tracks 2034, 2036 and slidable therein is an arcuate price-change plate 2046 axially-elongated and which is provided at its forward end with an upwardly-opening control ball-receiving pocket 2048 having an upwardly-rising bail keeper element 2050 at the inner end thereof which projects above the pocket 2048 and serves as an abutment to maintain, releasably, and seat a control ball 2052 within its associated pocket 2048.

Connected to the inner or rear end of the arcuate plate 2046 is one end of an elongated push-pull rod 2054 having a pair of circumferential axially-spaced grooves 2056, 2058 formed therein adjacent the outer rear end thereof. To the terminal end of the rod 2054 is fixedly-secured a manually-operable enlarged knurled control handle or knob 2060. As is seen in FIGURE 16, the rod 2054 extends through the opening 2044 formed in the back wall 2006 and is reciprocable therein to shift the plate 2046 axially of the sidewall 2028 in order to position the control ball 2052 adjacent the forward end of the annular wall 2028 or its back or inner end as the knob 2060 is manually-manipulated by the operator to cause the price-control plate 2046 to reciprocate within its groove 2044.

Reference numeral 2062 denotes an elongated spring element having a centrally-bowed portion 2064 (see FIGURE 14) which is selectively-engageable with one of two grooves 2056 or 2058, respectively, formed in the push-pull rod 2054 as the latter is pushed forwardly or pulled rearwardly, the spring element 2062 serving to releasably-secure the push-pull rod 2054 and its connected plate 2046 in their respective adjusted positions to serve a function to be described.

As is seen in FIGURE 14, the spring 2062 adjacent one end thereof is looped about a screw 2066 threaded into the back wall 2006 and which serves as a fulcrum for the spring element 2062. This end of the spring element 2062 terminates and is bent forwardly to be anchored in an opening 2068 formed in the back wall 2006. The other end of the spring element 2062 includes a laterally-bent end 2069 which abuts against the stop lug 2042.

Reference numeral 2070 denotes a screw threaded into the back wall 2006, the screw 2070 serving, as will be seen below, as a pivot pin or mounting for an elongated upright reversed C-shaped lever 2072 (reference being made to FIGURE 14) having a bight section 2074, an upper end section 2076 having an aperture 2077 extending transversely therethrough adjacent the outer end thereof and which is adapted to receive therethrough the shank of the screw 2070. The lever 2072 also includes a lower end section 2078.

As is seen in FIGURE 14, the upper end of the section 2076 and the central bight portion 2074 immediately below their junction are formed with an enlargement of the inner edge 2080 of the lever 2072 to form a downwardly-extending and downwardly-opening hook 2084. The hook 2084 includes a cam surface 2085 at the underside thereof and to which further reference will be made below.

The lower end section 2078 of the lever 2072 adjacent its junction with the bight 2074 is formed with a weight 2086, and the lower end section 2078 terminates in a cam surface 2088, the function of which will be explained below. It will be obvious from an inspection of FIGURE 14 that in the construction described above pertaining to the lever 2072, the lever 2072 is weighted so as to constantly bias the same for clockwise movement about the screw 2070 with reference to FIGURE 14 of the drawings.

A screw 2090 is also threaded into the back wall 2006 and has looped therearound the central portion 2092 of a second spring element 2094 having one of its ends 2096 anchored in the back wall 2006, and its other end 2098 extends toward the lower end of a second arcuate slot 2100 formed substantially in the lower half of the back wall 2006 (see FIGURE 14), the arcuate slot 2100 being located between the annular or cylindrical sidewall 2004 and the arcuate sidewall 2028. The second spring element 2094, adjacent its other end 2098, is formed with a lobe 2102 which traverses the lower end of the slot 2100.

Mounted for rotation within the sidewall 2028 and concentric therewith is a winged rotor ring 2104 having an annular sidewall 2106 and a substantially cylindrical back wall 2108 integral therewith and closing the back or rear end of the sidewall 2106. The sidewall 2106 at its forward end is integral with an outwardly-flaring truncated sector-shaped wing 2110 having opposed ends 2112, 2114, respectively, and an inwardly-extending arcuate cut-out 2115 at the apex end thereof. Adjacent its outer periphery, and intermediate the ends thereof, the wing 2110 is formed with a radially-extending slot 2116, the function of which will be explained below.

Projecting laterally and rearwardly from the back wall 2108 is an elongated substantially cylindrical pin 2118 having a flange 2120 at its outer terminal end. The back wall 2108 is also provided with a central bore 2122 which extends transversely therethrough, and when the device 2000 is assembled, the bore 2122 aligns with the bore 2032.

The winged rotor ring 2104 is telescoped within the sidewall 2028 which, in this embodiment of the invention, comprises the stator, with the pin 2118 extending transversely through the slot 2030 to project rearwardly of the back wall 2006.

Fitted within the winged rotor ring 2104 is a central rotor 2123 having a substantially discoidal main body portion 2124 from which forwardly-projects a concentrically-disposed annular flange 2126. As is seen in FIGURE 24, a sector-shaped lever 2128 has its inner end integrally-formed with the main body portion 2124 and the flange 2126 and the other end thereof projects outwardly beyond the outer periphery of the main body portion 2124. The sector-shaped lever 2128 has opposed ends 2130, 2132 and an arcuate cam end 2133 to all of which further reference will be made below.

Projecting forwardly of the main body portion 2124 and centrally thereof is a spur gear 2134, and from the back side of the main body portion 2124 laterally-projects a centrally-located integrally-formed and substantially cylindrical hub 2136 from which an integral shaft 2138 laterally and rearwardly projects (see FIGURE 16). As is seen in this last-named figure, the shaft 2138 extends through the bore 2122 and into the bore 2032 in which it is journaled for rotation, and the hub 2136 bears against the forward or front side of the cylindrical back wall 2108. To serve a function to be described, the back wall 2006 has projecting from a central portion thereof and laterally from the rear side thereof, an anchor pin 2139 having, at its outermost end, a pair of inwardly-extending diametric slots 2140. As is seen in FIGURE 16, the pin 2139 and the shaft 2138 are coaxially-aligned with one another. Upon assembly of the device 2000, the lever 2128 and the wing 2110 are disposed in substantially the same planes, but the arrangement is such that the arcuate end 2133 of the lever 2128 sweeps the arcuate cutout 2115 as the lever 2128 moves relative to the wing 2110.

Mounted for rotation on the hollow cylindrical stator 2028 and telescoped thereover is an inner annular rotor ring 2142 having a cylindrical sidewall 2144 in which is formed an axially-elongated slot 2146. Projecting laterally from the forward end of the sidewall 2144 is a segment-shaped element 2150 having opposed ends 2152, 2154, respectively. From the back or rear end 2155 of the sidewall 2144 rearwardly-project a pair of circumferentially-spaced and substantially parallel cylindrical rods 2156, 2158. With the device 2000 assembled as described, the rods 2156, 2158 are adapted to project through the above-described arcuate slot 2100 (FIG. 24) for swinging movement between the adjacent ends thereof.

Reference numeral 2160 denotes an annular outer rotor ring having a hollow cylindrical wall 2162. The outer rotor ring 2160 is mounted for free rotation on the inner rotor ring 2142 and is telescoped thereover. As is seen in FIGURES 16 and 24, the inner side of the sidewall 2162 is formed with a plurality of inwardly-opening axially-extending first series of pockets 2168, 2170, 2172 in the front half thereof, and a similar second series of pockets 2174, 2176 and 2178 in the back half of the sidewall 2162. Of these pockets the pocket 2168 is utilized in the coin-control device 2000 when a coin combination of four nickels is used, the pocket 2170 permits actuation of the coin-control device 2000 when the combination of coins in the amount of one dime and two nickels are deposited, and the pocket 2172 renders the device operational upon the deposit of two dimes.

With respect to the second series of pockets, the pocket 2174 constitutes the "zero" pocket, the pocket 2176 is employed in the presence of a coin combination of two nickels, and the pocket 2178 enables the device to operate in the presence of a single coin, a dime.

Projecting inwardly from the back side 2180 of the sidewall 2162 are a plurality of inwardly-extending circumferentially-spaced cut-outs 2182 receiving bearings 2184, respectively, therein, the bearings partially projecting from the back side of the sidewall 2180 to ride on the back wall 2006. Projecting forwardly from the front end 2186 of the sidewall 2162 is a cylindrical lug 2188 which serves a function to be described, and as is seen in FIGURES 16 and 24, the front and back halves of the inner side of the outer rotor ring 2160 are defined by an arcuate rib 2189.

Mounted on the anchor pin 2139 immediately adjacent the back wall 2006 is a centrally-apertured spacer washer 2190 which is followed outwardly by an arcuate cam 2192 having ends 2194, 2196 and a cam face 2198. The arcuate cam 2192 is centrally-apertured at 2200 to receive the outer end of the anchor pin 2139 therethrough. The cam 2192 is followed on the anchor pin 2139 by a split lock washer 2202 which is releasably-engaged within a circumferential groove 2204 formed in the outer end of the anchor pin 2139.

One end 2206 of a spiral or coil spring 2208 is anchored in one of the slots 2140 formed in the outer end of the anchor pin 2139, and the other end of the spring 2208 is looped to form a seat 2210 to receive the outer end of the cylindrical pin 2218.

Reference numeral 2212 designates a substantially cylindrical face plate having an arcuate notch 2214 extending downwardly from the upper end thereof, and the face plate 2212 adjacent the upper peripheral edge thereof is provided with a plurality of transversely-extending tapped openings 2216 which are adapted for alignment with openings 2218 extending through the sidewall 2004, these openings receiving therein the threaded screws 2220 to secure the face plate on the housing 2002.

Reference numeral 2222 designates a hollow cylindrical knob utilized to actuate the unit 2000. The knob 2222 includes an outer end wall 2224 integral at its outer periphery with a cylindrical sidewall 2226 and a centrally-located elongated substantially hollow cylindrical boss 2228 concentrically-disposed with respect to the sidewall 2226. Disposed within the boss 2228 and releasably-secured therein by a set screw 2230 is one end of a shaft 2232. The set screw 2230 is reached by a screwdriver or other tool (not shown) through the opening 2234 that extends transversely through the sidewall 2226 and is in alignment therewith. The outer end of the shaft 2232 terminates in a spur gear 2236 which is housed in a cavity 2238 formed in the back side of the face plate 2212 adjacent the upper end thereof, and the lower side of the cavity 2238 is disposed in open communication with the upper end of a centrally-located cavity 2240 in which is embraced and housed the spur gear 2134, the latter being in mesh with the spur gear 2236.

As is seen in FIGURES 16 and 24, the front end 2010 of the sidewall 2004 is provided with a coin-receiving notch 2242 which faces the notch 2214, and the sidewall 2004 is formed with an inwardly-extending coin-discharge slot 2244 at one side and adjacent its lower end.

Having described in detail the several component elements of this invention and their association relative to one another, the operation of the mechanism 2000 is deemed to be self-evident, but in the interest of clarity, a brief description of its operation follows; and in tracing the relationship between the several component elements of the invention, reference will be made, from time-to-time, to various figures of the drawings of which the disclosures of FIGURES 17 to 23, inclusive, will be referred to in particular since the same disclose the relative positions of some of the operating parts of the device 2000 under certain specific conditions.

Referring now more particularly to FIGURES 14, 16, 17 and 24, the component elements of the device 2000 are shown at rest and in FIGURE 17 reference numeral 2400 denotes the presence of four nickels, shown in phantom lines, as having been deposited by the operator through the coin-receiving notch 2242. The position of the coins 2400 as shown in this figure should be observed somewhat closely since the position of the coins could be considered as being typical if, for example, mint coins or coins not subjected to undue wear were deposited. Under such conditions, the coins could be held in the positions shown in this figure, due to the close tolerances which are involved in the control device 2000, and it will be observed that the last of the coins 2400 to be deposited makes tangent engagement with the side 2114 of the wing 2110 and similar engagement with the next lowermost coin 2400 whereas the lowermost one of the coins 2400 is held in spaced relationship due to the coefficient of friction away from the adjacent side 2154 of the segment-shaped element 2150. Should the coins be somewhat worn and approach the minimum tolerance provided by the device, the lowermost one of the coins 2400 would, of course, make tangential engagement with the adjacent side 2154 of the segment-shaped element 2150 as succeeding coins 2400 are deposited through the coin-receiving slot 2242. With the coins deposited and the device 2000 in its inoperative position of FIGURE 17, the control ball 2052 is seated within the zero pocket 2048. Now, as the operator begins the operating cycle of the device 2000, the handle 2222 is grasped and is turned in a clockwise direction. The gear 2236 will turn in the same direction and will transmit its motion to the gear 2134 which will then rotate in a counterclockwise direction. In its counterclockwise movement, the gear 2134 turns the central rotor 2123 in the same direction, causing engagement of the side 2130 of the sector-shaped lever 2128 with the adjacent side 2112 of the sector-shaped wing 2110, and since the sector-shaped wing 2110 is connected to the outer rotor ring 2160 through the cylindrical lug 2188 which is disposed in the slot 2116 formed in the sector-shaped wing 2110, the outer rotor 2160 will turn counterclockwise as viewed in FIGURE 17 and in FIGURE 24, causing the four-nickel pocket 2168 to turn toward the control ball 2052 and to become aligned therewith.

Now, the sector-shaped wing 2110 in moving this distance, it being remembered that the side 2114 is tangent to the uppermost one of the coins 2400, has caused the coins 2400 to move downwardly in the device 2000 as viewed in FIGURE 17 until the first of the coins 2400 makes tangential engagement with the adjacent side 2154 of the segment-shaped element 2150. This contact is made at exactly the same time the pocket 2168 is brought into alignment with the control ball 2052. If, on the other hand, the coins 2400 are somewhat worn, the turning of the handle 2222 would effect engagement with the last one of the nickels 2400 at a point spaced from the positions shown in FIGURE 17, but under any circumstances, the alignment referred to above would not be achieved until side 2114 and the side 2154 of the sector-shaped elements 2110, 2150, respectively, make tangential engagement with the first and last ones of the deposited coins. If fewer than four nickels 2400 were deposited or if the dimensions of the coins 2400 were worn below the desired tolerance control, the alignment would not occur if the converse were true, that is, if the diameters of the coins 2400 exceeded a predetermined tolerance.

As in the preceding embodiment of this invention, the operability of the device 2000 is dependent upon the length of the chord of each of the coins 2400, the chord being determined by the points of tangency with one another and the points of tangency of the outermost ones of the coins 2400 with the sides 2114 of the sector-shaped element 2110 and the side 2154 of the segment-shaped element 2150. If the total length of the involved chords is within the tolerances permitted by the manufacturer of the device 2000, it will, of course, operate. On the other hand, if the sum of these chords is greater than the permitted tolerances, then there will be no alignment of the pocket 2168 with the control ball 2052 while in its zero pocket 2048 and the device 2000 is, under these circumstances, inoperative.

Assuming that the alignment of the pocket 2168 with the ball 2052 is proper, then as the knob or handle 2200 is continued to be turned, the force exerted on the uppermost one of the coins 2400 is transmitted through the subsequent coins 2400 to and against the end 2154 of the segment-shaped element 2150 causing this element to rotate in a counterclockwise direction together with the segment-shaped element 2110 and the coins embraced therebetween.

The condition of perfect alignment is clearly illustrated in FIGURE 18. The position of the outer rotor ring 2160, the inner rotor ring 2142, and the control ball 2052, after the coins have been accepted by the device, is shown in FIGURE 19 of the drawings. In this figure it is seen that as the inner rotor ring is forced to turn under the influence of the force exerted on the coins 2400, the ring 2142 forces the control ball 2052 upwardly out of its seat 2048 into the pocket 2168, the depth of which is sufficient to accept the control ball 2052 to the extent that it rides tangentially on the outer peripheral surface of the sidewall 2028. Continued turning of the knob or handle 2222 forces the inner rotor ring 2142 and the outer rotor wing 2160 to the position shown in FIGURE 20, wherein the control ball 2052 transfers from the pocket 2168 to the pocket 2040 formed in the stator sidewall 2028.

Now, it must be recalled that with the component elements of the invention in their original starting positions, the segment-shaped element 2150 effectively blocked the coin-discharge slot 2244. But, as soon as the lowermost one of the coins 2400 is brought into abutment against the end 2154 by means of the pressure exerted on the series of coins 2400 by the sector-shaped element 2110, the segment-shaped element 2150 was moved, as described above, to relinquish its blocking position across the slot 2244, causing the same to be substantially open to receive the coins 2400 therethrough as the same are expelled by the pressure exerted by the side 2114 of the sector-shaped element 2110 on the coins and against the side 2154 of the segment-shaped element 2150.

It will be recognized that as the control ball 2052 becomes seated in the pocket 2040, the outer rotor ring 2160 is freed from its locking engagement with the inner rotor ring 2104 whereby the outer rotor ring 2160 may rotate independently of the inner rotor ring 2106 to assume its position shown in FIGURE 21. This freedom of movement permits the sector-shaped element 2110 to continue rotation in the named direction to insure that all of the coins will be swept from the device 2000 through the discharge slot 2244. The expelled coins may be collected in any suitable container or receptacle (not shown).

Before examining the kinematic action that has taken place as the handle 2222 was turned clockwise, aside and apart from the action described above in connection with receiving and discharging the coins 2400, it should be noted that the device 2000 affords means for accurately measuring the diameter of the inserted coin or coins and hence, their respective chords. In this connection, it should be noted that the radial distance between the outermost edge or periphery of the flange 2126 and the adjacent inner side of the sidewall 2004 is of such length as to permit acceptance of coins within the device 2000 having a diameter falling within the maximum tolerance. This is of importance since the coins having the maximum diameter must, necessarily, make tangential engagement between these two surfaces. If the coin has a diameter greater than that of the accepted standard, then the operator, upon release of the handle 2222, frees the lever 2128 whereby the same will turn in the reverse direction to strike against the unaccepted coin or coins to force their ejection in a manner to be described below.

Referring now more specifically to FIGURE 14 of the drawings, it is seen that the rods 2156, 2158 are normally disposed adjacent the lower end of the slot 2100. In these positions, the rod 2158 bears against the cam surface 2088 of the lever 2072 and holds the same against pivotal movement in a clockwise direction about its mounting screw 2070. The rod 2156, it is seen, is positioned in the slot 2100 in displaced relationship relative to the upper end thereof. The cylindrical pin 2118 is disposed in its at rest position at the upper end of the slot 2030. Now, as the handle 2222 is turned in the aforesaid clockwise direction, the inner rotor ring 2142 will move in the same direction when viewed in FIGURE 14, causing the pins 2156, 2158 to move upwardly in the slot 2100. During this course of movement, the pin 2158 escapes from behind the bowed portion 2102 of the spring element 2094 and frees the lever 2072 for swinging movement in a clockwise direction about its support screw 2070. This swinging movement of the lever 2072 is substantially prevented for as the inner rotor ring 2142 is rotated, the winged rotor ring 2104 is also rotated in the same direction, escaping under the cam surface 2085 in its movement in the groove 2030 and strikes the end 2196 of the cam 2192, causing the latter to turn in a clockwise direction (reference being made to FIGURE 14), whereby the cam surfaces 2198 and 2085 engage and hold the lever 2072 in substantially its original position.

The pin 2118 has now traveled the full length of the arcuate slot 2030 and is in its dotted-line position as shown in FIGURE 14. This position will be taken upon the full throw of the handle or knob 2222 and is reached substantially simultaneously as the rod 2156 makes engagement with the upper end of the slot 2100. The position described above is only reached, however, when the proper coin or combination of coins has been introduced into the device 2000.

The hook 2084, the arcuate cam 2192, and the pin 2118 cooperate to prevent the device or unit 2000 from being fraudulently operated in that, for example, should the operator of the device 2000, after making the proper coin deposit to cause the component elements of the device to assume their operative positions, then attempt to retrieve one or more coins by releasing the handle 2200 before the pin 2156 has made its full throw, the hook 2084 will have moved into the path of movement of the pin 2118, thereby preventing the winged rotor wing 2104 from returning to its original starting position and locks the outer rotor ring 2160 and, consequently, the inner rotor ring 2142 against return movement. This is, in effect, an anti-pumping mechanism which requires that once the proper coin or combination of coins has been deposited in the device 2000 and the operative cycle initiated, it must be completed once the same has been started. There can be no return of the deposited coins once the hook 2084 swings across the return movement of the pin 2118.

Assuming that the proper coins (four nickels, in this case) have been deposited and accepted by the device 2000 and that portion of the operating cycle described above has been completed, the operator now releases the handle 2222 and the winged rotor wing 2104, under the influence of the spring 2208 drives the pin 2118 in the reverse direction in the slot 2030. This turns the sector-shaped wing 2110 in the reverse direction causing its side 2114 to strike against the side 2132 of the sector-shaped element 2128, causing it to turn in its reverse direction and the winged rotor ring 2104 in reversing its direction causes the outer rotor ring 2160 to turn in its reverse direction from its position shown in FIGURE 21 toward its position shown in FIGURE 20, and at this time, the side 2112 of the sector-shaped element 2110 will strike against the adjacent side 2152 of the segment-shaped element 2150 driving the same in the reverse direction to re-assume its blocking position across the coin-discharge slot 2244. As these movements take place, the control ball 2052 is forced upwardly out of the pocket 2040 into the pocket 2168 to ride on the outer periphery of the stator sidewall 2028 toward the zero pocket 2048 where the elements temporarily assume their relative positions shown in FIGURE 18, and after which the control ball 2052, upon being deposited in the zero pocket 2048 disengages the outer rotor ring 2160 for free movement relative to the inner rotor ring 2142 to assume its position shown in FIGURE 17. With the component elements of the device 2000 restored to their original positions, the same is ready for its next cycle of operation.

FIGURES 22 and 23 are illustrative of the locked condition of the device 2000 by reason of the introduction of an improper coin combination to the device. Referring to FIGURE 22, and still assuming that the device 2000 has been designed to operate upon the introduction of coinage in the amount of twenty-cents, as described, let it be assumed that the operator has deposited three nickels and one-penny. Because of the difference in the dimension of the penny with respect to the standard nickel, a misalignment of the outer rotor ring 2160 with respect to the control ball 2052 takes place, the difference being measured in X-degrees. The device becomes inoperative because, of course, the control ball 2052 cannot come out of the zero pocket 2048 unless the segment-shaped element 2150 will remain stationary and in its blocked position across the coin-discharge slot 2244.

In FIGURE 23 is illustrated the inoperative positions of the component elements of the device which result, for example, from the insertion of a badly-worn coin or slug which, while very close to the diameter of a proper coin, is not close enough to permit positive alignment of the pocket 2168 with the control ball 2052 while seated in its zero pocket 2048. Operation of the handle 2222 results in the turning of the outer rotor ring 2160 as shown, but the inner rotor ring 2142 in being late in starting its complementary movement attempts to displace the control ball 2052 from the zero pocket 2048 and in so doing, causes the control ball 2052 to jam against the stationary or zero pocket 2048, the arrow A across the control ball 2052 indicating the direction of the force against the stationary or zero pocket 2048 and the adjacent side of the pocket 2168 of the outer rotor ring 2160.

The device 2000 will operate for the fixed predetermined price in the manner described above upon the insertion of two nickels and a dime, or two dimes. In the case of the two nickels and the time, turning of the handle 2222 will cause the pocket 2168 to pass freely across the control ball 2052, there being no tangential engagement between the adjacent side of one of the coins with the side 2114 and tangential engagement of the lowermost coin 2400 with the side 2154 until the pocket 2170 assumes the position of the pocket 2168 shown in FIGURE 18. At that time, and assuming that the coins are all of the proper diameter, the control ball 2052 will be transferred to the pocket 2170 in the manner described and the operation of the device proceeds in the usual manner.

To operate the device 2000 with the deposit of two dimes, the spacing of the pocket 2172 relative to the zero pocket 2048 is such that the tangential engagement of the side 2114 with the uppermost dime 2400 occurs at the same time as tangential engagement is made between the lowermost dime 2400 with the side 2154, and the device becomes operative in the manner described.

The rib 2189 and the groove 2163 are substantially coextensive and, as has been stated above, the rib 2189 serves to separate the pockets at one side of the outer rotor ring used for one predetermined price setting from the pockets on the opposite side of the outer rotor ring 2160 which are located to render the device 2000 operative with respect to coinage deposited therein representing a still different price. Thus, the operator in changing the price value from one to another (twenty-cents to a dime, for example), turns the handle or knob 2222 until the pocket 2174 (the zero pocket) is aligned with the control ball 2052 while seated in its zero pocket 2048, and at that time, the operator will grasp the knurled knob 2060 and draw the same to the left, reference being made to FIGURE 16 of the drawings. This causes the push-pull rod 2054 to move to the left to effect disengagement of the bowed portion 2064 of the spring element 2062 from the groove 2058 to re-seat the bowed portion 2064 within the groove 2056 to releasably-secure the push-pull rod 2054 in its new position. As the push-pull rod 2054 is shifted, the control ball 2052 together with its seat 2048 in the push-pull rod 2054 move to the left, the control ball 2052 being now aligned with the zero pocket 2174. The rib 2189 separates the groove 2163 from a similar and oppositely-disposed groove 2163' which is, again, coextensive with the rib 2189.

With the control ball 2052 set in its new position, the device 2000 becomes operative upon the insertion of two nickels and the turning of the handle 2222, the turning movement causing the pocket 2176 to be aligned with the control ball 2052, and the same sequence of actions takes place as described before, the pocket 2176 being substituted for any one of the pockets 2168, 2170 or 2172. In a like manner, the device in its newly-set condition becomes operative upon the insertion of a single dime, whereupon rotation of the control knob 2222 positions the pocket 2178 over the control ball 2052 in its zero pocket 2048, as before, and the operation of the device is repeated.

In this embodiment of the invention, the device 2000 may be made to serve a utilitarian function in that the path of movement of the pin 2156 (or the rod 2158) may be made to actuate a lock lever or to close, for example, a microswitch connected in an electric circuit. Such an electric switch is indicated in phantom lines in FIGURE 14 and is generally designated by reference numeral 2000. In the given embodiment, the microswitch 2700 is provided with a switch-actuating arm 2702 having its free end 2704 disposed in the path of movement of the cylindrical rod 2156 so that as the rod 2156 moves toward the upper end of the slot 2100, the pin 2156 abuts the free end 2704 causing the switch 2700 to close. As the cylindrical pin 2156 moves in the reverse direction, the arm 2702, due to its resiliency, will move in the same direction causing the switch 2700 to open.

In FIGURES 25 to 35, inclusive, is illustrated still another embodiment of the coin-control device wherein the invention involves the provision of a multi-price, multi-coin unit having, as before, two rotors and a stator, but wherein the stator comprises a control pin for controlling the price setting.

In the embodiment of the invention, reference numeral 3000 denotes the coin-control unit, in general, the unit including a substantially hollow cylindrical casing having an annular sidewall 3002 and a discoidal back wall 3004 integrally-formed therewith. The open outer end of the sidewall 3002 is reduced in diameter to form a planar shoulder 3005 and projecting forwardly from the back wall 3004 (FIG. 28) in concentrically-spaced relation relative to each other and to the sidewall 3002 is a pair of divider walls 3006 and 3008, respectively. The back wall 3004 is provided with an inwardly-extending normally vertically-disposed U-shaped groove 3010 (see FIGURE 35) extending diametrically thereacross, the groove 3010 being defined by sidewalls 3012, 3014 and the bight wall 3016.

The outer end of the sidewall 3002 is provided with a coin-discharge slot 3018, the slot 3018 being defined at its sides by sidewalls 3020, 3022 and a bight wall 3024. The inner side of the sidewall 3002, at a point intermediate the sidewalls 3020, 3022 is formed with an axially-extending pocket 3026, the function of which will be described below, and as is seen in FIGURE 35, the outer or forward end of the pocket 3026 opens into the plane of the bight wall 3024. The sidewall 3002 is provided adjacent the lower end thereof, with an axially-extending inwardly-opening arcuate pocket which extends from the back end of the sidewall 3002 to open, at its forward end, in the plane of the shoulder 3005. The divider wall 3006 is arcuate in configuration, and the confronting ends are concave as at 3030 and 3032, respectively.

The adjacent sides of the sidewall 3002 and the divider wall 3006 define therebetween a groove 3034 and, as is seen in FIGURE 35, a substantially cylindrical rod 3036 having an end integral with the back wall 3004 has its other end projecting perpendicularly therefrom and disposed within the groove 3034. In a similar manner, the two concentrically-spaced divider walls 3006, 3008 define therebetween a second groove 3038, and a second substantially cylindrical rod 3040 is disposed therein, the cylindrical rod 3040 having its innermost end fixedly-secured to and integral with the back wall 3004. The second cylindrical rod 3040 is, preferably, radially-aligned with the cylindrical rod 3036, and the cylindrical rod 3040 is disposed adjacent to, but spaced from the opening defined by the concave ends 3030, 3032 of the divider wall 3006. The inner end of the opening defined by the concave ends 3030, 3032 is in open communication at its inner end with the groove 3010.

Reference numeral 3042 denotes, in general, an elongated substantially rectangular latch lever having opposed ends 3044, 3046, respectively, of which the upper end 3046 (see FIGURES 28 and 35) is beveled downwardly from its front or forward face to its rear or back face. The latch lever 3042 is provided, intermediate its ends 3044, 3046 with an elongated longitudinally-extending slot 3048, and interposed between the lower end of the slot 3048 and the adjacent end 3044 is a transversely-extending opening 3050. The latch lever 3042 is mounted for reciprocation within the groove 3010 with the beveled end 3046 thereof facing upwardly in the embodiment herein illustrated.

Disposed within the slot 3048 is an elongated helicoidal spring 3052 having opposed upper and lower ends 3054, 3056, respectively. As is seen in FIGURE 28, the upper end 3054 of the helicoidal spring 3052 normally seats against the adjacent upper end of the slot 3048, and the lower end 3056 of the spring 3052 normally abuts against a substantially cylindrical pin 3058 having an end thereof fixedly and integrally-connected with the back wall 3004, the other end of the pin 3058 projecting inwardly into the slot 3048. From this described construction it will be understood that the latch lever 3042 is constantly biased for movement in an upward direction.

At 3060 is indicated a substantially flat thin back closure plate having a plurality of spaced transversely-extending openings 3062 formed therein adjacent the outer periphery thereof. The back closure plate 3060, adjacent the lower end thereof, is provided with an elongated inwardly-extending slot 3064. The back closure plate 3060 is releasably-secured to the back or rear end of the sidewall 3002 by means of a plurality of connecting screws 3066. As is seen in FIGURES 26 and 28, the back closure plate 3060 spans the back wall 3004, the groove 3010 formed therein, and the adjacent side of the latch lever 3042. In assembly, the slot 3064 of the back closure plate 3060 confronts in longitudinally-aligned relation the lower end of the groove 3010 and is in open communication therewith. As is seen in FIGURES 26 and 28, one end of a leaf spring 3066 is fixedly-connected to the back closure plate 3060 as by rivets 3068. The leaf spring 3066 is outwardly-bent as at 3070 away from the adjacent side of the back closure plate 3060 to provide a free end 3072 to which further reference will be made below.

As is seen in the several figures of the drawings, the free end 3072 confronts the slot 3064 in outwardly-spaced and parallel relation relative thereto.

Disposed within the sidewall 3002 is an outer rotor ring 3074 having an inner face slidably-engaging the shoulder 3004 and the adjacent end of the divider wall 3006, the outer rotor ring 3074 spanning the groove 3034. As is clearly seen in FIGURE 35, fixedly-secured to the outer side of the outer rotor ring 3074 is a truncated substantially sector-shaped element 3076 having a bowed end 3078 and a straight end 3080. The apex end of the sector-shaped element 3076 is arcuately-shaped as at 3082. Extending inwardly from the outer periphery and outer face of the outer rotor ring 3074 is a radially-extending pocket 3084 having an end wall 3086 (see FIGURE 35) which is inclined upwardly from the front face of the outer rotor ring 3074 toward its rear face, and as seen in FIGURE 35, the pocket 3084 at its outer end opens into the cylindrical plane of the peripheral edge of the outer rotor ring 3074. To serve a function to be described below, the pocket 3084 serves as a seat for a releasable lock ball 3088. Also to serve a purpose to be described is an elongated substantoially cylindrical rod 3090 having one of its end fixedly-secured to the outer rotor ring at a distance spaced from the pocket 3084. The other end 3092 of the cylindrical rod 3090 projects laterally and perpendicularly from the back or rear side of the outer rotor ring 3074. As is seen in FIGURE 35, the pocket 3084 and the cylindrical rod 3090 are located adjacent to, but spaced from the bowed end 3078 of the sector-shaped element 3076 and its straight end 3080.

The inner side 3094 of the outer rotor ring 3074 is interrupted adjacent the straight end 3080 of the sector-shaped element 3076 by an arcuate groove 3096 having a shoulder 3098 at that end thereof adjacent the straight end 3080 of the sector-shaped element 3076. The arcuate groove 3096 extends across the inner side of the sector-shaped element 3076 and terminates in a pocket 3100 having a shoulder 3102 remotely-disposed with respect to the shoulder 3098. As is seen in FIGURE 35, the upper end of the shoulder 3102 intersects the curvilinear plane of the inner side 3094 of the outer rotor ring 3074.

The outer rotor ring 3074, when assembled in the sidewall 3002, effects an insertion of the end 3092 of the cylindrical rod 3090 within the groove 3034 in close proximity to the cylindrical rod 3036. Disposed within the groove 3034 is an elongated helicoidal spring 3104 having an end 3106 abutting against the cylindrical rod 3036, and its other end 3108 abutting against the end 3092 of the cylindrical rod 3090. Thus, and with reference to FIGURE 35 of the drawings, the cylindrical rod 3090 is seen to be constantly biased for movement toward the cylindrical rod 3036, and in so moving, turns the outer rotor ring 3074 in a counterclockwise direction.

Reference numeral 3110 denotes an inner rotor ring having an outer peripheral edge 3112 and an inner cylindrical side 3115. As is seen in FIGURE 28, the inner rotor ring 3110 is adapted to be telescopically-mounted and rotatably-mounted within the outer rotor ring 3074, the inner rotor ring riding on the outer ends of the divider walls 3006, 3008 and spanning the groove 3038. Fixedly-secured or formed-integrally with the outer face or side of the inner rotor ring 3110 is a segment-shaped element 3114 having a bowed end 3116 and an opposed straight end 3118. Inserted in the inner rotor ring 3110 opposite the segment-shaped element 3114 is a cylindrical rod 3116 having an end 3318 projecting laterally and perpendicularly from the inner side or face of the inner rotor ring 3110. The inner cylindrical side 3115 is provided with an inwardly-extending notch 3120, the function of which will be explained below, and the inner edge 3122 of the segment-shaped element 3114 is given an arcuate configuration.

The inner rotor ring 3110 is provided with a pair of opposed inner and outer sides 3124, 3126, respectively. That side of the inner rotor ring 3110 oppositely-disposed with respect to the notch 3120 is inwardly-stepped from its inner side to form an abutment flange 3128 (see FIGURES 27 and 28) having a cam face 3130 at one end thereof. The abutment flange 3128 terminates in a second cam face 3132 disposed at one end of a groove extending transversely throughout the width of the inner rotor ring 3110. The other end of the groove 3124 terminates in a shoulder 3136. As is clearly seen in FIGURE 27, the outer ends of the cam faces 3130, 3132 smoothly merge with the outer peripheral edge 3112 of the inner rotor ring 3110.

With the inner rotor ring 2114 assembled within the outer rotor ring 3074, the segment-shaped element 3114 of the inner rotor ring 2114 overlies the outer face of the outer rotor ring 3074, and the inner end of the sector-shaped element 3076 overhangs the outer side or face 3126 of the inner rotor ring 3110.

Upon assembly, the extending end 3118 of the cylindrical rod 3116 is disposed within the cylindrical groove 3038 in juxtaposition relative to the cylindrical rod 3040 and, disposed within the cylindrical groove 3038 is an elongated helicoidal spring 3138 having its opposed ends 3140, 3142 engaging, respectively, the end 3092 of the cylindrical rod 3090 and the cylindrical rod 3040. Thus, and referring specifically to FIGURE 35 of the drawings, the inner rotor ring 3110 is constantly biased for counterclockwise movement and in the same direction as the outer rotor ring 3174.

Referring now more specifically to FIGURES 28 and 35, reference numeral 3144 designates a cylindrical drum adapted to be telescoped within the divider wall 3008. As is seen in FIGURE 28, the inner end of the drum 3144 slides on the back wall 3004 and the forward end thereof extends substantially to the plane of the front or forward faces of the inner and outer rotor rings 3110, 3074, respectively. Projecting radially from the drum 3144 is a connector pin 3146 which is adapted to be releasably-secured within the notch 3120 formed in the inner rotor ring 3110. Projecting forwardly from the front wall 3148 of the drum 3144 and centrally-located with respect thereto is an elongated shaft 3150.

The device 3000 is price-controlled by means of a control rod 3152 clearly shown in FIGURES 28 and 35. The control rod 3152 includes an elongated substantially cylindrical shank 3154 having a cylindrical groove 3160 formed therein intermediate the ends thereof. One end of the control rod 3152 terminates in an enlarged head 3158 having diametrically-opposed planar sides 3160, 3162 which serve a function to be described. The outer end of the enlarged head 3158 terminates in a knurled manually-operable knob 3164.

The shank 3154 is adapted for insertion through the slot 3064, the opening 3050 and the forward end thereof is normally disposed in the groove 3134 (FIG. 27). The control rod 3152 is adapted for reciprocation within the opening 3050 and is movable, selectively, into one of two predetermined positions. In its outermost position shown in FIGURE 28, the control rod 3152 is set to condition the device 2000 to become operable upon the insertion of a dime. Movement to the left of the control rod 3152 as viewed in FIGURE 28 is limited by a split washer 3166 which is engaged within the groove 3156 and projects circumferentially from the shank 3154. The diameter of the washer 3166 is greater than the inside diameter of the opening 3050 and hence, the movement to the left of the control rod 3152 will be prevented upon engagement of the washer 3166 with the adjacent side of the back closure plate 3060. The price-control rod 3152 is also rotatable in such a manner as to cause the enlarged head 3158 to engage the back closure plate 3060 and to span the slot 3064 whereby the control rod 3152 is prevented from moving forwardly or to the right, as viewed in FIGURE 28. Without this stop means the price-control rod would tend to move forwardly under the influence of the free end 3072 of the spring 3066 which abuts thereagainst and tends to constantly bias the control rod for movement in a forward direction.

When the control rod 3152 is turned 90° from the position shown in FIGURES 28 and 35, the same will move forwardly in the groove 3134 to serve a function to be described. It should be noted that when the control rod is moved to its aforementioned forward position, the opposed sides 3160, 3162 are slidably-received within the slot 3064 and that the free end 3072 of the spring 3066 is releasably-engaged within a diametrically-extending slot 3168 formed in the outer end of the operating knob 3164. Thus, the control rod 3152 is insured against displacement through inadvertence or accident when the same has been moved to its forward position wherein the device 3000 is conditioned to operate upon the deposit of a dime.

Reference numeral 3170 denotes the door of a cabinet or other vending device, the door 3170 having a cylindrical opening 3172 extending transversely therethrough adjacent a side or end thereof. In the representation shown in FIGURE 28, the door 3170 is pivotal in a clockwise direction toward its open position and counterclockwise to its closed position illustrated in this figure. The door 3170 serves as a closure member for an opening 3174 formed in a side of a cabinet 3175 of which the opening is partially defined by a door jamb or other side frame member 3176. The door jamb or side frame member 3176 includes an outwardly-projecting lip 3178 disposed in the path of movement of the upper beveled end 3046 of the latch lever 3042 whereby the door 3170 is prevented from pivoting in a clockwise direction to its open position. Movement of the latch lever 3042 downwardly as viewed in FIGURE 28 permits the escape of the beveled end 3046 from the lip 3178, permitting the door 3170 to be pivoted toward its open position defined above. While the door 3170 is still in its open position and the device 3000 restored to its inoperative position to be described below, the beveled end 3046 assumes its position shown in FIGURE 28 whereby when the door turns in a counterclockwise direction to effect its closure movement, the beveled end 3046 will strike against the inclined surface 3180 formed in the jamb or side frame member 3176 gradually depressing the latch lever 3042 in its groove 3010 until the beveled end 3046 escapes behind the lip 3178 to again secure the door 3170 in its locked position illustrated.

If desired, the door 3170 may be provided with a metallic front face or liner plate 3182 suitably apertured at 3184 to receive the device 2000 therethrough. Upon installation of the device 3000 in the opening 3172 (which is coaxially-aligned with the aperture 3184) the device 3000 is completed by telescoping a front face plate 3186 over the shaft 3150. To this end, the front face plate 3186 includes a substantially discoidal main body portion 3188 having a centrally-located inwardly-extending cylindrical boss 3190 formed integrally therewith which is adapted to be received within the arcuate end 3082 of the sector-shaped element 3076 and the arcuate edge 3122 of the segment-shaped element 3114. The front face plate 3186 is also provided with a centrally-disposed bore 3192 which receives the shaft 3150 therethrough, and the outer end of the shaft 3150 is received within an axially-extending socket 3194 which extends axially from the inner end of a manually-operable handle 3196. A set screw 3198 fixedly-secures the handle 3196 with the shaft 3150 to permit manual rotation of the latter. The main body portion 3188 is also provided with a coin-receiving opening 3196 which extends transversely therethrough and which is disposed, preferably, above the releasable lock ball 3088 when the same is disposed within its pocket 3084.

Having described and illustrated the component elements of the coin-control device 3000, the operation thereof is detailed below.

Assuming that all of the elements of the device 3000 are in their respective inoperative positions shown in FIGURES 27, 28 and 29, and with the control rod 3152 disposed in its outermost position illustrated in FIGURE 28, the device 3000 conditioned to become operative upon the insertion of a single coin such as, for example, a dime indicated by reference numeral 3200. The coin or dime 3200 is inserted through the coin-receiving opening 3196 and falls between the inner side of the front face plate 3186 and the adjacent sides of the outer and inner rotors 3074, 3110, respectively. The coin 3200 will come to rest on the boss 3190 and the end 3078 of the sector-shaped element 3076. In this position, the coin 3200 comes to rest with its peripheral edge in juxtaposition relative to the releasable lock ball 3088, but is displaced upwardly therefrom. The ends 3080 and 3118 of the sector-shaped element 3076 and the segment-shaped element 3118, respectively, are in abutting relationship as is shown in FIGURE 34, and the end 3116 of the segment-shaped element 3114 is displaced away from the adjacent peripheral edge of the dime or coin 3200. The inner end of the price-control rod 3152 is disposed in the path of movement of the cam face 3130 and has been withdrawn to the left, as viewed in FIGURE 28, a sufficient distance so that as the inner rotor ring 3110 rotates in a clockwise direction, as viewed in FIGURE 27, the abutment flange 3128 slidably-escapes past the inner end of the control rod 3152. If desired, a greater clearance between the inner end of the control rod 3152 and the flange 3128 may be provided. In this position, the second cam face 3132 is displaced outwardly away from the adjacent inner end of the control rod 3152.

Now, as the operator grasps the handle 3196 and rotates the same in a clockwise direction, reference being made to FIGURE 25, the inner rotor ring 3110 will start its movement in the same direction since the inner rotor ring 3110 is locked to the shaft 3150 by means of the pin and notch connection 3146, 3120, respectively. Now, as the handle 3196 is turned in the clockwise direction the segment-shaped element 3114 moves from its at-rest position shown in FIGURE 34 to its position shown in FIGURE 30 wherein the bowed end 3116 makes tangential contact with the adjacent edge of the coin 3200. In so moving, the flange 3128 has moved across the pocket 3100 (see FIGURE 30) to place the cam face 3132 immediately adjacent the control rod 3152 with the cam face 3130 overlying the pocket 3100 and merging with the contingent side 3130A thereof. The outer rotor ring 3074 and the inner rotor ring 3110 are now locked together in such a manner that continued turning movement of the handle 3196 in the aforesaid clockwise direction causes these elements of the device 3000 and the inserted coin 3200 to move in the same direction as a single unit. As this movement continues, the flange 3128 will pass in front of the adjacent end of the control rod 3152 until the pocket 3130 is disposed in vertical alignment with the control pin 3152 (see FIGURE 32). At this moment, the cam face 3130, the control rod 3152 and continued turning of the handle 3196 forces the control rod 3152 downwardly into its dotted-line position shown in FIGURE 32 to position the coin 3200 opposite the coin-discharge slot 3018. Continued turning movement of the handle 3196 exerts force on the coin 3200 causing the same to be expelled from between the adjacent ends 3078, 3116 of the segment-shaped element 3176 and the segment-shaped element 3114, respectively, through the coin-discharge slot 3018 and into a collecting container or receptacle (not shown).

In FIGURE 32 two coins are shown, 3200 and 3200A which serve a second feature of this invention, but for all purposes described above, the position of the component elements of the device 3000 are properly shown and described when using the device 3000 in conjunction with but a single coin 3200. Since the control pin 3152 is depressed within the pocket 3100 which has a depth substantially equal or slightly greater than the diameter of the control rod 3152, the inner rotor ring 3110 may continue to rotate to force the cam face 3130 beyond the pocket 3100 since its outer periphery 3112 will only make tangential engagement therewith. This has the effect of exerting a total and complete force on the deposited coin 3200 to insure its ejection through the coin-discharge slot 3078.

To set the device or unit 3000 to operate upon the deposit of two coins, such as two dimes 3200, 3200A, the coins are deposited through the coin-receiving opening 3196, one after the other, and the first one thereof, 3200A, will come to rest in the position described above, that is, on the end 3078 of the sector-shaped element 3076 at a point spaced from and above (see FIGURE 34) the releasable lock ball 3088. The second coin, 3200, will come to rest in tangential relation (see FIGURE 31) with respect to the coin 3200 at one side thereof and its other side will be tangent with the end 3116 of the segment-shaped element 3114 (see FIGURE 31). Now, as the handle 3116 is rotated in its aforesaid clockwise direction, there may be little or no relative movement between the inner rotor ring 3100 and the outer rotor ring 3074, and these two elements together with the deposited coins 3200, 3200A will rotate the single unit from their positions shown in FIGURE 31 until the pocket 3130 is disposed in vertical alignment with the control pin 3152. As the pocket 3130 approaches this alignment, the cam face 3132 engages the control rod 3152 and depresses the same into the pocket 3130 with the first of the deposited coins 3200A now confronting the coin-discharge slot 3018. The exertion of continued force on the handle 3196 forces the coin 3200A to be ejected through the coin-discharge slot 3018 at which time the component elements of the device 3000 assume substantially the position shown in FIGURE 32. Now, as the coin 3200A is expelled through the coin-discharge slot 3018, the device 3000 is conditioned substantially the same as it would be in the event only a single coin 3200 had been deposited. Hence, the continued turning of the handle 3196 causes the flange 3128 to escape past the outer or forward end of the control pin 3152 to bring the cam face 3130 over and past the pocket 3028 causing the last of the coins 3200 to be expelled through the coin-discharge slot 3018.

After the coin or coins 3200 and/or 3200, 3200A have been deposited in the device 3000 and the device has been actuated in the manner described above, the release of the handle 3196 by the operator frees the shaft 3150 for rotation in a counterclockwise direction under the influence of the helicoidal springs 3104 and 3138 causing the inner and outer rotor rings 3110, 3074, respectively, to return to their initial inoperative positions. The return movement of the inner and outer rotor rings 3110, 3074, respectively, is effected by the engagement of the ends 3080, 3118 upon release of the handle 3196 and under the influence of the helicoidal springs 3104, 3138, the end 3080 in moving relative to the end 3118 strikes thereagainst causing the inner and outer rotor rings 3110, 3074, respectively, to move substantially simultaneously in a counterclockwise direction, reference being made to FIGURE 32, causing both cam faces 3130 and 3132 to escape past the pocket 3100 and to re-present the groove 3134 to the control rod 3152, the movement of these elements toward their inoperative positions being limited by the re-engagement of the shoulder 3136 and shoulder 3098 with the control rod 3152 at their respective positions shown in FIGURE 27. The movement of the outer rotor ring 3074 in this last-named direction causes, of course, the control rod 3152 to ride up the side of the pocket 3100 and into the grooves 3134, 3006.

Under either condition of operation, it will be understood that as the control pin moves from its normally inactive position between the confronting ends 3030, 3032 of the divider wall 3006 and into the pocket 3100 it so moves in the direction of the force exerted by the helicoidal spring 3052 which, as stated above, constantly tends to bias the control pin 3152 for movement in an upward direction to be re-seated between the ends 3030, 3052 of the divider wall 3006. This biasing movement also causes the latch lever 3042 to move upwardly into its locked position shown in FIGURES 25, 26 and 28.

The releasable lock ball 3088 is introduced in this embodiment of the invention as an anti-pump feature to prevent the operator of the device from obtaining the return of the second or subsequent coins therefrom after having first conditioned the device 3000 for operation. The anti-lock device becomes operable to force the operator of the device 3000 to turn the handle 3196 clockwise for the full amount of its throw, whether there be one or two coins deposited therein.

Referring to FIGURES 30 and 31 the releasable lock ball 3088 is shown as being disposed entirely within its associated pocket 3084. Now, however, upon rotation of the sector-shaped element 3076 from its at-rest position shown in FIGURE 34, to the position shown in FIGURE 30, the sector-shaped element 3076 remains stationary. Continued movement of the handle 3196 in the manner described above, presents the coin 3200 (or 3200A) in confronting relationship relative to the coin-discharge slot 3018, and at the same time, the pocket 3084 becomes aligned with the pocket 3026 formed in the sidewall 3002 intermediate the ends 3020, 3022 of the coin-discharge slot 3018. Due to the angle of inclination of the end wall 3086, the releasable lock ball 3088 will transfer from the pocket 3084 to the pocket 3026 as long as a coin 3200A or 3200 overlies the two pockets and the ball now located in the pocket 3026. This is the condition shown in FIGURE 32. Now, however, if it be assumed that the operator attempts to retrieve the coin 3200 by releasing the handle 3196, the reverse movement of the inner rotor ring is locked with the sidewall 3002 since a portion of the lock ball 3088 extends into the pocket 3084 and prohibits the counter rotation of the inner rotor ring since a portion of the coin 3200 abuts the ball 3088 and restrains the same from moving upwardly along the sidewall 3026A of the pocket 3026 and fully into the pocket 3084. Hence, as long as a coin such as the coin 3200 or the coin 3200A is present in the position shown for the coin 3200 or in overlying relationship such as is shown by the coin 3200A relative to the ball 3088, the operator must complete the full throw of the handle 3196 to render the device 3000 operative.

FIGURES 36 to 43, inclusive, illustrate still another embodiment of this invention wherein the material departure from this embodiment and those described above relates to means for positively disengaging the control element utilized in locking the inner and outer rotor rings for simultaneous movement. At the same time, the instant embodiment of this invention illustrates the provision of means for adjusting the inner rotor ring relative to the outer rotor ring after assembly in order to render the coin-control device operative within the permissive plus-and-minus tolerance ranges. It will be recalled that all of the embodiments of the invention described above are operative if the coin or coins deposited have a diameter within a few thousandths-of-an-inch on either side of a standard diameter, and working within such close tolerances, it is absolutely essential that the pockets formed in the outer rotor ring make absolute alignment with the slot formed in the inner rotor ring and the control ball carried thereby when deposited in any one of the pockets formed in the stator. Additionally, this embodiment of the invention illustrates the versatility of the control device to utilize interlocking control elements which depart in configuration from the spherical ball 468 of the embodiment shown in FIGURES 1 to 11, inclusive, or the cylindrical control pin 3152 shown in that embodiment of the invention illustrated in FIGURES 25 to 35, inclusive. Thus, and in this further modification of the invention, the control mechanism is generally designated by the reference numeral 4000 and is seen to comprise a substantially hollow cylindrical stator 338′ having an inwardly-extending annular flange 4002 extending thereacross intermediate the ends thereof. The exterior side of the stator 338′ may be provided with a pocket, such as, for example, the zero pocket 340′.

As in the preceding embodiments of this invention, an inner rotor ring 450′ is mounted over the stator 338′ for rotation relative thereto, and the stator 450′ is provided with a transversely-extending slot 454′ which is adapted to accommodate an axially-elongated ogive-shaped control element 4004 (see FIGURE 43).

The inner rotor ring 450′ is formed with an outwardly-opening substantially U-shaped groove 4006 (see FIGURE 40) which carries an endless helicoidal spring 4008.

The control element 4004 has a substantially rectangular main body portion 4010 in which is cut a substantially U-shaped groove 4012, and the lower or apex end of the control element 4004 is arcuately-shaped as at 4014 to conform to the configuration of the pocket 340′. Normally, the control element 4004 is seated in the pocket 340′ with its groove 4012 aligned with the groove 4008 in order that it, too, may receive therethrough a portion of the helicoidal spring 4008. The spring 4008 bears against the bight portion 4016 of the control element 4004 to constantly bias the control element for movement toward its seat in the pocket 340′, or others similar thereto (not shown).

The outer rotor ring 400′ is formed with a plurality of pockets 434′, 436′ which are substantially rectangular in configuration and which have a width slightly greater than the width of the main body portion 4010. The control element 4004 is adapted, of course, for displacement upwardly into one of the pockets 4034′ or 4036′ to lock the outer and inner rotors together in the manner described, and if the deposited coin 4018 has the proper diameter, and the construction and assembly of the device 4000 is perfect, the stator 388′, the inner rotor ring 450′ and the outer rotor ring 400′ will be aligned perfectly as is illustrated in FIGURE 37 while, at the same time, providing for the tolerance $T^1$, $T^2$ shown in FIGURE 36 if the coin 4018 is substandard.

Reference numeral 4020 denotes an eccentric mounted on a screw 4022 threaded into the flange 4002. As is seen in FIGURE 36, the eccentric 4020 is made to be tangent to the side 480′ of the segment-shaped element 478′. If the coin 4018 is perfect, the end 481′ of the segment-shaped element 478′ will make tangency at point $a$ with the coin 4018, the side 614′ of the wing 610′ will make tangential contact at $a_1$, and the outer edge of the coin 4018 will make tangential contact with a cuvilinear plane containing the peripheral edge of the flange 406′.

Under the ideal set of circumstances, when the outer rotor 400′ and the inner rotor 450′ are locked together by the coin 4018, the apex end 4014 of the control element 4004 will ride up the side of the pocket 340' and onto the outer side of the stator 338' in the manner shown in FIGURE 38.

If, and assuming that the device 4000 has been perfectly constructed and assembled, a coin 4018 is deposited therein and has a diameter greater than that of the standard coin the device 4000 is designed to accommodate, the condition such as is shown in FIGURE 42 would be obtained wherein the relative movement between the outer rotor ring 400' and the inner rotor ring 450' is insufficient to cause perfect alignment of the pocket 434' with the slot 452' providing the overlap or tolerance dimension T'₁. This situation is also possible upon the original assembly of the device or through a slight error in the construction of the component elements thereof, and to correct the same upon assembly, the eccentric 420 is turned clockwise, reference being had to FIGURE 36, to obtain the proper alignment between the inner and outer rotor rings as is shown in FIGURE 37. In the event the deposited coin has less than the standard diameter, the outer rotor ring 400', again assuming that the device 4000 has been perfectly constructed and assembled, will take its position relative to the inner rotor ring 450' as illustrated in FIGURE 41 showing the mis-alignment T'₂, and should a corresponding mis-alignment be present upon the assembly of the device 4000 this same situation may be corrected by turning the eccentric 4020 in the counterclockwise direction, reference again being had to FIGURE 36 of the drawings.

It is thus seen that the eccentric 4010 provides the manufacturer with ready means for correcting the assembled device 4000 on its assembly whereby the same may be adjusted to accept the plus-and-minus tolerances for any given deposited coin.

The function of the helicoidal spring 4008 is to insure the prompt and positive disengagement of the control element 4004 from its interlocking action with the outer rotor ring 400' when the control element 4004 is positioned in alignment with a pocket, such as the pocket 340' formed in the stator 338'.

Having described and illustrated several embodiments of this invention in detail, it will be understood that the same are offered merely by way of example, and that this invention is to be limited only by the scope of the appended claims.

What is claimed is:

1. A device to initiate a work cycle, said device being operable in the presence of a control insert having predetermined standard dimensions, said device comprising first and second spaced elements normally disposed at rest positions and being movable in two directions common to each other, means operable to effect movement of said first element in one of said directions toward said second element to engage and hold said control insert therebetween with said first element held in spaced relationship from said second element a predetermined distance corresponding to a given predetermined standard dimension of said control insert, said insert preventing further relative movement of said first element toward said second element, said means being operable to move said elements and said insert as a whole in said one direction and without relative movement therebetween, and work cycle initiating means operatively connected on and responsive to said movement of said elements as a unit, a stationary member adjacent at least one of said elements; a lock mounted in said stationary member, said lock engaging one of said elements and lock-receiving means in the other of said elements, said lock-receiving means being so located as to align with and receive said lock and free the locked element only if said control insert is of acceptable dimensions.

2. A device as defined in claim 1, and means disposed in the path of travel of said unit to limit its movement in said one direction, and means on said elements cooperating when said unit reaches its limit of movement to eject said insert from therebetween.

3. A device as defined in claim 2, and means operable to move said elements in the opposite direction to their respective said rest positions subsequent to the ejection of said insert from therebetween.

4. A device as defined in claim 3, and means operable upon movement of one of said elements to engage and hold said insert against movement other than in the direction of its ejection when said elements, moving as a unit have reached said limit in said one direction.

5. A coin-controlled device comprising support means, a rod mounted for reciprocation on said support means, work means connected on said rod and selectively operable in response to the reciprocal movement of said rod, an inner rotor ring and an outer rotor ring rotatably mounted on said support means for movement about a common axis, said outer rotor ring surrounding said rod and having its inner side in juxtaposition relative to said rod, said outer rotor ring having a pocket formed therein opening into said inner side thereof, said pocket being normally disposed to one side of said rod and in spaced relation relative thereto when said outer rotor ring is in its rest position, said outer rotor ring being movable in one direction to receive said rod wholly therein and consequently to operate said work means, cam means disposed on the outer periphery of said inner rotor ring and disposed in spaced relation and at one side of said rod with said pocket normally positioned therebetween, said pocket having a side proximate said cam means, coin-engageable means fixedly secured to said inner and outer rotor rings, respectively, and movable therewith, said coin-engageable means being normally disposed in spaced confronting relation relative to one another when said inner and outer rotor rings are at rest, said coin-engageable means on said outer rotor ring when at rest being tangentially engageable at the periphery of a coin to support said coin between said coin-engageable means, actuating means connected on said inner rotor ring and operable to effect tangential engagement of said coin-engageable means on said inner rotor ring with the periphery of said coin and to move said cam means relative to said pocket a distance corresponding to the length of the cord measured between the points of tangency of said coin-engaging means with said coin, and said rotors and said coin being operable by said actuating means to turn as the unit in said one direction to cause cam means to engage said rod and to force said rod into said pocket only when said cam means forms an uninterrupted continuation of said side of said pocket, said rod when disposed in said pocket locking said outer rotor ring against further movement in said one direction as said inner rotor ring continues its movement in said one direction and relative to said outer rotor ring to pass over said rod and to eject said coin from between said coin-engaging means.

6. A coin-controlled device as defined in claim 5, and resilient means connected on said support means and with said support rod, said resilient means constantly biasing said rod from moving in a direction away from said pocket.

7. A coin-controlled device as defined in claim 6, and adjustable means on said support means engageable with said inner rotor ring to adjust the space between said coin-engageable means.

8. A coin-controlled device as defined in claim 6, wherein said work means comprises an elongated latch lever having a pair of opposed ends and mounted for reciprocation on said support means, said rod being connected to one end of said lever, and said resilient means being connected on and extending between the other end of said lever and said support means.

9. A coin-controlled device as defined in claim 8, and resilient means connected between said support means and said inner and outer rotor rings constantly biasing said rings for return movement towards their said rest positions.

10. A coin-controlled device as defined in claim 9, and abutment means on said outer rotor ring disposed on the other side of said rod engageable with said rod to stop said return movement of said outer rotor ring at its rest position, and abutment means on said coin-engageable means cooperating to stop said return movement of said inner rotor ring at its rest position.

11. A coin-controlled device as defined in claim 5, and second cam means formed on the outer side of said inner rotor, said second cam means being disposed intermediate said first cam means and said pocket and said proximate side thereof, said rod being disposed in the path of movement of said second cam means as said inner rotor ring is moved in its said one direction, said coin-engageable means being spaced from each other when said rotor rings are at rest a distance sufficient to accommodate a plurality of coins therebetween with each of said coins being tangent with the next adjacent coin at the peripheries thereof and with the first of said coins tangentially engaging said coin-engageable means of said outer rotor, said actuating means being operable to move said inner ring relative to said outer rotor ring in said one direction to move its coin-engageable means into tangential engagement with another of said plurality of coins and measuring therebetween the sum of the length of said cords extending between each adjacent pair of points of tangency, said second cam means moving together with said inner rotor ring relative to said outer rotor ring a distance corresponding to the distance traveled by said coin-engageable means on said inner rotor ring to effect its tangency with said another of said coins and positioning said second cam means to form an unbroken continuation of said sidewall only when said spacing between said coin-engageble means is of a predetermined length, said actuating means being operable to move said coin-engaging elements and said coins therebetween and said pocket in said one direction to cause said second cam to engage said rod and move the same into said pocket when said cam means form said continuation and to hold said outer rotor ring against rotor rotation in said one direction, and said actuating means being subsequently operable to cause said outer side of said inner rotor ring to pass over said rod and move in said one direction to cause said coin-engageable mens on said inner rotor to move towards the coin-engageable means on said outer rotor ring to expel said coins therebetween.

12. A coin-controlled device as defined in claim 10, wherein said inner rotor ring is telescoped within said outer rotor ring, said inner rotor ring having a groove in the outer side thereof terminating at one of its ends at said second cam means, said second cam means being actually offset from said first cam means and forming an abutment flange therebetween, said outer ring having a groove formed in the inner side thereof adjacent the other side of said pocket, one end of said last-named groove opening into said pocket and the other end thereof terminating in a shoulder, said grooves normally confronting one another when said inner and outer rotor rings are at rest, and said rod having an end thereof normally extending transversely of said inner and outer rotor rings and through said grooves when said rotor rings are at rest, said rod having its other end mounted for reciprocation in said one end of said latch lever in a direction perpendicular to the direction of the reciprocal movement of said lever whereby said rod may be moved selectively to present said one end thereof to either of said cam means.

13. A coin-controlled device as defined in claim 12, wherein said support means comprises an axially elongated hollow cylindrical sidewall having a back wall extending across the rear end thereof, said back wall having a pair of hollow cylindrical divider walls projecting forwardly therefrom, said divider walls being conjointly spaced from one another and from said cylindrical sidewall, said divider walls defining a first annular groove therebetween and a second annular groove between said outermost one of said divider wall and said cylindrical sidewall, abutment means fixedly secured to said back wall and projecting, respectively, into said first and second annular grooves, said outermost one of said divider wall having an opening extending transversely therethrough, said back wall having a groove formed therein extending diametrically thereacross and an elongated notch extending inwardly from the outer periphery thereof and opening at its inner end into said last-named groove, said latch lever being disposed for reciprocation in said last-named groove with said one end thereof movable longitudinally of said notch and with said control rod being reciprocably carried in said notch for reciprocation in the direction of the reciprocal movement of said latch lever and transversely through said latch lever in a direction perpendicular to the ricprocable movement thereof, said outer rotor ring being telescopically mounted in said cylindrical sidewall, abutment means projecting from each rotor ring and extending into, respectively, each of said annular grooves in juxtaposition relative to said first-named abutment means, said resilient means being disposed in each of said annular grooves and engaging each juxtaposed pair thereof and constantly biasing each of said pair of abutment means for movement towards one another, said rotor rings spanning, respectively, said annular grooves, and said sidewall having a coin-receiving opening formed therein disposed intermediate said coin-engaging means when it rests, and a coin-discharge opening formed therein, said coin-engaging means on said outer rotor ring normally blocking said coin-discharge opening when said rotor rings are at rest and movable to an unblocking position as said unit is moved in said one direction.

14. A coin-controlled device comprising an axially elongated substantially cylindrical sidewall having a pair of opposed open front and back ends, a back wall extending transversely across said back end of said cylindrical sidewall and closing the same, said back wall at the outer side thereof having a groove formed therein extending diametrically thereacross, a closure plate secured to said back wall and extending across said groove formed in said back wall, said back wall having a notch formed therein extending inwardly from the outer periphery thereof and in open communication with one end of said groove, an elongated lever mounted for reciprocation in said groove, said lever having one end thereof reciprocable across said notch in the direction of its elongation, said lever having a longitudinally extending slot formed therein, said back wall having a pin projecting outwardly therefrom and disposed in said slot, resilient means disposed in said slot and abutting said pin and at end of said slot adjacent the other end of said lever, said resilient means constantly biasing said lever for extended movement away from the periphery of said back wall, said lever being extendible and retractable within said groove, said back wall having a pair of radially spaced rods projecting forwardly therefrom and a pair of annular divider walls concentrically spaced with respect to each other and with respect to said sidewall and defining therebetween a pair of annular grooves of one of said rods being disposed within, respectively, one of said annular grooves, said sidewall having a coin-receiving opening formed adjacent thereto at the front end thereof and a coin-discharge opening similarly formed but spaced from said coin-receiving opening, an outer rotor ring rotatably mounted in and supported on said sidewall, said outer rotor ring having a coin-engaging element fixedly secured thereon for movement therewith, said element having a pair of opposed ends, said outer rotor ring spanning the outermost one of said annular grooves and having a rod projecting therefrom toward said back wall and disposed in said outermost one of said annular grooves in juxtaposition relative to that rod disposed in said outermost one of said annular grooves and projecting from said back wall, a helicoidal spring disposed in said outermost one of said annular grooves and having its ends abutting the juxtaposed pair of rods and constantly biasing said outer rotor ring for movement in one direction, said outer rotor ring having an arcuate groove formed in the inner side thereof and terminating in a shoulder of one of its ends and opening into an axially extending arcuate groove, an inner rotor ring telescopically mounted in said outer rotor ring for rotation therein, said inner rotor ring having a coin-engaging element secured thereon and having a pair of opposed ends, said inner and outer rotor rings when at rest having adjacent ends of their respective coin-engaging elements disposed in abutting relationship relative to one another when said rings are at rest and with respect of other ends disposed in spaced confronting relation relative to each other, said inner rotor ring spanning the innermost one of said annular grooves and having a rod projecting outwardly therefrom towards said back wall and disposed in juxtaposition relative to said rod projecting from said back wall and into said innermost one of said annular grooves, a helicoidal spring disposed in said last-named annular groove and having its end abutting said last-named pair of juxtaposed rods to constantly bias said innermost ring for movement in said one direction to tend to maintain said abutting relationship between said adjacent ends of said coin-engaging elements, the other ends of said coin-engaging elements being normally positioned on opposite sides of said coin-receiving slot and said coin-engaging element on said outer rotor ring normally blocking said coin-discharge opening when said rotor rings are at rest, said inner rotor ring having an axially extending arcuate groove formed in the outer side thereof and normally confronting said arcuate groove formed in the inner side of said outer rotor ring when said rotors are at rest, said arcuate groove in said inner rotor ring having a shoulder at one end thereof contiguous to said shoulder at one end of said outer rotor ring when said rotors are at rest, the other end of said arcuate groove of said inner rotor ring terminating in a pair of axially circumferentially spaced cam means with the cam means nearest said shoulders on said inner rotor ring being adjacent to that side of said arcuate axially extending groove formed in said outer rotor ring when said rings are at rest, actuating means connected on said inner rotor ring to effect rotation thereof, an elongated control rod having an end thereof mounted for reciprocation on said one end of said lever in a direction perpendicular to its reciprocable movement, said control rod having its other end normally extending transversely across said confronting arcuate grooves and in the path of movement of said cam means, said one end of said control rod being movable from its said position in the path of movement of said cam means to a second position disposed only in the path of movement of said cam means remotely disposed relative to said shoulder formed on said inner rotor ring, and a front cover plate extending across the front end of said sidewall in spaced relation relative to the adjacent side of said rotor rings.

15. A coin-controlled device as defined in claim 14, wherein said sidewall is provided with a notch opening into the inner side and front end thereof and disposed intermediate the ends of said coin-discharge opening, and a notch formed in said outer rotor ring, said last-named notch opening into the front side of said outer rotor ring and its periphery and having a back wall inclining inwardly from said front side of said outer rotor ring to its outer periphery, and a ball normally disposed wholly within said last-named notch and movable to extend partially into said notch formed in said side wall to hold said outer rotor ring against movement in said one direction in the presence of a coin extending thereover.

16. Electric switch operating means for operating an electric switch having a switch actuating arm, said means including a support, endless means mounted for movement in one direction on said support, said endless means including a plurality of segments having outer peripheries of equal lengths, each adjacent pair of segments being separated by an equal space, indexing means mounted on said support for parallel movement relative to said endless means and including a pawl for selective insertion into a preselected space between a pair of segments upon movement of said indexing means in one direction, means operable to move said indexing means and said pawl a predetermined distance relative to said segments and the spaces therebetween, said pawl having a neb alternately and sequentially engageable on the periphery of one of said segments and into a space on one side thereof, and a second pawl connected to said switch arm to alternately move the same to and from its open and closed position in response to the rise and fall of said second pawl.

17. A time accumulator electrical switch operating device for an electric switch having a switch arm movable alternately to its open and closed positions, said device comprising support means, an electric motor mounted to said support means and having a drive shaft extending transversely therethrough, a housing mounted on said support means, a substantially cylindrical reset wheel fixedly secured on said drive shaft for rotation therewith and disposed in said housing, said reset wheel having abutment means projecting from a side thereof, and endless hollow cylindrical rotor mounted on said drive shaft and freely rotatable with respect thereto, said rotor being provided with a plurality of equal length segments separated from one another by spaces of equal length, said segments each having an inner and outer periphery, abutment means projecting laterally from one side of said endless rotor and disposed in the path of travel of said abutment means on said wheel, an indexing rotor mounted for free rotation on said drive shaft and telescopically mounted within said endless rotor with the periphery thereof juxaposed with respect to the inner peripheries of said segments, ratchet means mounted on said indexing rotor and projecting laterally from the periphery thereof for sequential engagement with said spaces between said segments, an elongated cylindrical rod projecting from one said of said indexing rotor, a ratchet pawl mounted on said support and sequentially engageable, alternately, with said outer peripheries of each of said segments and within said spaces, said ratchet pawl being connected with said switch arm to alternately open and close said switch as said ratchet pawl rises and falls in response to the rotary movement of said endless rotor, a casing mounted on said support and fixedly secured thereto, said casing including a hollow cylindrical sidewall having a back wall extending transversely across an end thereof, said back wall having a bore extending transversely therethrough and an arcuate slot displaced to one side of said bore, an arcuate stator fixedly secured to said back wall and projecting laterally from a side thereof, said stator having a plurality of pockets formed therein and opening into the outer side thereof, said rod extending transversely through said slot and being longitudinally movable therein, and an inner rotor ring telescopically mounted over said stator and having a slot extending transversely therethrough, said inner rotor ring having a sector-shaped element projecting laterally and inwardly from an end thereof, said sector-shaped element having a bifurcated end receiving said cylindrical rod therein, said inner rotor ring having a segment-shaped element fixedly secured thereon and projecting inwardly from the other end thereof, an outer rotor ring telescopically mounted over said inner rotor ring, said outer rotor ring having a plurality of pockets formed therein and opening into the inner side thereof, a central rotor ring, said central rotor ring including a substantially cylindrical main body portion mounted on said drive shaft and freely rotatable relative thereto and an elongated coin-engaging element having a pair of opposed ends, said coin-engaging element comprising a wing projecting outwardly from said main body portion and having ends disposed in confronting relation relative to the opposed ends of said segment-shaped element, said main body portion having a central bore extending transversely therethrough, a lever mounted for rotation between said ends of said wind, said lever including a shaft rotatably journaled within said bore formed within said main body portion of said rotor ring, a coin-receiving slots formedt in, said casing and similar coin-receiving slots formed therein, said slots being spaced from one another, said segment-shaped element normally being disposed in blocking position relative to said coin-discharge slot, said wing normally being disposed on one side of said coin-receiving slot and said coin-discharge slot with a pair of said confronting ends of said wing and segment-shaped element being disposed in abutting relation, said coin-receiving slot receiving a coin therethrough for support on the other end of said segment-shaped element, said lever being movable into engagement with the adjacent side of said wing to cause said wing to rotate to cause the other end thereof to tangentially engage said coin and to force said wing and coin to move said segment-shaped element from across said coin-discharge slot and to eject said coin therethrough.

18. A time accumulator electrical switch operating device as defined in claim 17, wherein said pockets formed in said inner and outer rotor rings are separated by shoulders and grooves, and a control ball normally disposed in one of said pockets formed in said arcuate stator and movable with said inner rotor ring across said shoulders for deposit in a preselected one of said pockets formed in said outer rotor ring.

19. A time accumulator electrical switch operating device as defined in claim 18, and wherein said inner and outer rotor rings are locked together during the transfer of said ball from said pocket in said arcuate stator to said pocket in said outer rotor ring for transfer from said pocket formed in said outer rotor ring to a preselected pocket formed in said arcuate stator.

20. A time accumulator electrical switch operating device as defined in claim 19, and means for effecting actuation of said lever in one direction, and resilient means for rotating said lever in the opposite direction to effect engagement thereof with said other end of said wing to return the same to its original position.

21. A multi-price multi-coin control device comprising an elongated hollow cylindrical housing including a sidewall having a pair of opposed ends, an end wall extending transversely across one of said ends and having a central opening formed therein and a pair of transversely extending slots offset with respect to said opening, a second sidewall projecting laterally from said back wall and concentrically disposed in confronting relationship relative to said first sidewall, said second sidewall being disposed intermediate said slots, said second sidewall having an axially extending pocket formed therein and a divider wall extending transversely across said pocket intermediate the ends thereof, said second sidewall having a pair of confronting ends and a plate axially and slidably mounted between said confronting ends towards and away from the opposed ends of said second sidewall, a control ball normally seated on said plate, an inner rotor ring rotatably and telescopically mounted on said second sidewall, said inner rotor ring having a slot extending transversely therethrough, a pair of cylindrical rods fixedly secured thereto and projecting from a side of said inner rotor ring through one of said slots and a segment-shaped element fixedly secured to said inner rotor ring and projecting laterally from the other end thereof, an outer rotor ring telescopically mounted about said inner rotor ring and having a first series of axially extending pockets formed therein opening into the inner side thereof adjacent that side of said outer rotor ring proximate said back wall and a second series of pockets formed therein opening into the inner side of said outer rotor ring and disposed adjacent the opposite side of said outer rotor ring, a winged rotor ring including a substantially cylindrical sidewall and an end wall extending across an end thereof, said end wall having a central bore and an offset rod projecting laterally from a side thereof, said rotor ring being telescopically mounted within said second sidewall and being rotatable therein with said rod projecting through the other of said slots, said winged rotor ring including a sector-shaped element projecting laterally and outwardly therefrom and disposed in the path of movement of said segment-shaped element, said sector-shaped wing having a slot formed therein, a pin projecting laterally from said outer rotor ring and engageable within said slot whereby said outer rotor ring and said rotor wing are rotatable as a unit, a centrally located rotatable member including a main body portion having a shaft projecting laterally from a side thereof, said shaft being journaled for rotation within said bore formed in said end wall of said rotor wing and said bore formed in said back wall, said central rotor having a spur gear projecting laterally from the other side thereof and a lever extending laterally beyond the outer periphery thereof in the path of movement of said sector-shaped element, a face plate fixedly secured to said sidewall, gear means disposed on said face plate and meshing with said gear mounted on said central rotor, handle means connected with said gear means to effect rotation thereof, a C-shaped lever pivotally mounted on said back wall and having an end thereof disposed in the path of movement of one of said pair of rods, said C-shaped lever having hook means formed thereon and swingable with said C-shaped lever across the path of movement of said last-named rod, cam means pivotally mounted on said back wall and disposed within the path of movement of said hook means and engageable by said last-named rod for movement out of the path of movement of said last-named rod, and resilient means connected with said last-named rod constantly biasing said winged rotor for movement in one direction.

22. In a coin-control device, means defining a coin path having a pair of spaced ends, coin-admission and discharge means communicating with said path adjacent, respectively, said ends of said path, first means normally extending across said coin path and blocking said discharge means at one end of said path, second means normally positioned adjacent said coin-admission means and out of said coin path, means to force said second means into said coin path to engage an edge of a coin disposed is said coin path with an opposed edge of said coin engaging said first means, said forcing means being effective to move said second means to force said first means away from said discharge means and to effect cooperation between said first means and said second means to eject said coin through said discharge means, and means responsive to acceptable coin dimensions for locking either one of said first and second means if a coin of unacceptable dimensions is inserted.

23. In a coin-control device including a housing having a coin passage defined therein including a pair of opposed ends, coin-admission means at one of said ends of said passage and coin-discharge means at the other end of said passage, first means mounted on said housing and extending across said passage intermediate said ends thereof and adjacent said discharge means, second means mounted on said housing and movable with respect thereto, said second means being disposed adjacent said coin-admission means and normally out of said passage, said second means being movable into said passage to engage one edge of a coin deposited therein the other edge of which is supported on said first means, said second means being effective to move said first means away from said discharge means and to cooperate therewith to eject said coin through said discharge means, and means connected to said first means continuously movable in one direction in response to sequential operation of said second means, and means responsive to acceptable coin dimensions for locking either one of said first and second means if a coin of unacceptable dimensions is inserted.

24. In a coin-control device as defined in claim 1, and means cooperating with said first means to prevent operation of said operable means to effect movement of said first means in the absence of a plurality of coins.

References Cited

UNITED STATES PATENTS

| | | | |
|---|---|---|---|
| 699,252 | 5/1903 | Smith. | |
| 2,349,359 | 5/1944 | MacCordy | 194—83 X |
| 2,712,868 | 7/1955 | Allen et al. | 194—78 |
| 3,054,492 | 9/1962 | Michaels | 194—83 X |

SAMUEL F. COLEMAN, *Primary Examiner.*